US012748808B2

(12) United States Patent
Epstein et al.

(10) Patent No.: US 12,748,808 B2
(45) Date of Patent: *Sep. 29, 2026

(54) ADVERTISEMENT DISPLAY SYSTEM AND ASSOCIATED METHODS

(71) Applicant: adMarketplace, New York, NY (US)

(72) Inventors: Adam J. Epstein, New York, NY (US); Michael Yudin, New York, NY (US); James Hill, New York, NY (US)

(73) Assignee: ADMARKETPLACE, New York, NY (US)

( * ) Notice: Subject to any disclaimer, the term of this patent is extended or adjusted under 35 U.S.C. 154(b) by 354 days.

This patent is subject to a terminal disclaimer.

(21) Appl. No.: 18/155,882

(22) Filed: Jan. 18, 2023

(65) Prior Publication Data

US 2023/0153360 A1 May 18, 2023

Related U.S. Application Data

(63) Continuation-in-part of application No. 17/834,160, filed on Jun. 7, 2022, now Pat. No. 11,907,302, which (Continued)

(51) Int. Cl.
*G06F 17/00* (2019.01)
*G06F 16/903* (2019.01)
(Continued)

(52) U.S. Cl.
CPC .. *G06F 16/90344* (2019.01); *G06F 16/90332* (2019.01); *G06F 16/909* (2019.01); *G06F 16/9566* (2019.01)

(58) Field of Classification Search
CPC ......... G06F 16/90344; G06F 16/90332; G06F 16/909; G06F 16/9566; G06F 16/9535;
(Continued)

(56) References Cited

U.S. PATENT DOCUMENTS 5,761,655 A 6/1998 Hoffman
7,007,074 B2 2/2006 Radwin
(Continued)

OTHER PUBLICATIONS

Liangda Li et al, Exploring Query Auto-Completion and Click Logs for Contextual-Aware Web Search and Query Suggestion. In Proceedings of the 26th International Conference on World Wide Web, International world Wide Web Conferences Steering Committee, Republic and Canton of Geneva, CHE, 539-548. (Apr. 2017).
(Continued)

*Primary Examiner* — Greta L Robinson
(74) *Attorney, Agent, or Firm* — Mark Malek; Widerman Malek, PL

(57) ABSTRACT

A computer-implemented system to determine and display advertisements to a remote computer. The system may include one or more servers, a data store, a processor, a controller, a predefined matching keyword database, a product listing advertisement (PLA) database, and a matching unit. The matching unit may receive a partial query term inputted into a search access point. The matching unit may match the partial query term to create a list of matching keywords, perform a keyword relevancy process, create a list of top matched keywords, match the top matched keywords with associated listings, perform an associated listing relevancy process, create a list of top associated listings. The matching unit may send the list of top associated listings to display advertisement elements adjacent the search access point upon receipt of the partial query term and prior to completion of entry of the whole query term.

24 Claims, 16 Drawing Sheets

Related U.S. Application Data is a continuation of application No. 16/871,321, filed on May 11, 2020, now Pat. No. 11,409,805.

(60) Provisional application No. 62/854,353, filed on May 30, 2019.

(51) Int. Cl.

| | |
|---|---|
| ***G06F 16/9032*** | (2019.01) |
| ***G06F 16/909*** | (2019.01) |
| ***G06F 16/955*** | (2019.01) |

(58) Field of Classification Search

CPC ........... G06Q 30/0251; G06Q 30/0256; G06Q 30/0275

See application file for complete search history.

(56) References Cited

U.S. PATENT DOCUMENTS

| | | | |
|---|---|---|---|
| 7,617,197 | B2 | 11/2009 | Stanton et al. |
| 7,831,584 | B2 | 11/2010 | Rothamn |
| 7,921,107 | B2 | 4/2011 | Chang et al. |
| 8,073,860 | B2 | 12/2011 | Venkataraman et al. |
| 8,176,069 | B2 | 5/2012 | Timm et al. |
| 8,463,830 | B2 | 6/2013 | Criou et al. |
| 8,504,437 | B1 | 8/2013 | Agarwal et al. |
| 8,700,653 | B2 | 4/2014 | Hansson et al. |
| 8,706,750 | B2 | 4/2014 | Hansson et al. |
| 8,838,603 | B1 | 9/2014 | Djabarov et al. |
| 9,020,834 | B2 | 4/2015 | Gnanasambandam et al. |
| 9,922,344 | B1 | 3/2018 | Christophe et al. |
| 9,959,547 | B2 | 5/2018 | Lewis et al. |
| 10,049,149 | B2 | 8/2018 | Zhang et al. |
| 10,643,237 | B2 | 5/2020 | Snyder et al. |
| 10,824,678 | B2 | 11/2020 | Hornkvist et al. |
| 11,409,805 | B2 * | 8/2022 | Epstein ............... G06F 16/9532 |
| 2003/0208472 | A1 | 11/2003 | Pham |
| 2005/0256766 | A1 | 11/2005 | Garcia et al. |
| 2006/0026147 | A1 | 2/2006 | Cone et al. |
| 2006/0195442 | A1 | 8/2006 | Cone et al. |
| 2007/0027773 | A1 | 2/2007 | Lee |
| 2007/0100915 | A1 | 5/2007 | Rose et al. |
| 2008/0221983 | A1 | 9/2008 | Ausiannik et al. |
| 2008/0255937 | A1 | 10/2008 | Chang et al. |
| 2009/0292677 | A1 | 11/2009 | Kim |
| 2011/0208822 | A1 | 8/2011 | Rathod |
| 2011/0238491 | A1 | 9/2011 | Bilenko et al. |
| 2012/0296743 | A1 | 11/2012 | Velipasaoglu et al. |
| 2013/0173398 | A1 | 7/2013 | Wang et al. |
| 2014/0280015 | A1 | 9/2014 | Marantz et al. |
| 2015/0106201 | A1 | 4/2015 | Agarwal |
| 2017/0103412 | A1 | 4/2017 | Norgaard et al. |
| 2019/0138540 | A1 | 5/2019 | Hu et al. |

OTHER PUBLICATIONS

Bhaskar Mitra et al. On user interactions with query auto-completion. In Proceedings of the 37th international ACM SIGIR conference on Research development in information retrieval, Association for Computing Machinery, 1055-1058. <https://doi.org/10.1145/2600428.2609508> (Jul. 2014).

* cited by examiner

ADVERTISEMENT DISPLAY SYSTEM AND ASSOCIATED METHODS

RELATED APPLICATIONS

This application is a continuation-in-part application to and claims priority under 35 U.S.C. § 120 to U.S. patent application Ser. No. 17/834,160 filed on Jun. 7, 2022 and titled COMPUTER IMPLEMENTED SYSTEM AND METHODS FOR IMPLEMENTING A SEARCH ENGINE ACCESS POINT which, in turn, is a continuation and claims priority under 35 U.S.C. § 120 to U.S. patent application Ser. No. 16/871,321 filed on May 11, 2020 and titled COMPUTER IMPLEMENTED SYSTEM AND METHODS FOR IMPLEMENTING A SEARCH ENGINE ACCESS POINT ENHANCED FOR SUGGESTED LISTING NAVIGATION, which, in turn, claims priority under 35 U.S.C. § 119(e) to U.S. Provisional Patent Application Ser. No. 62/854,353 titled SYSTEM AND METHODS FOR IMPLEMENTING A SEARCH ENGINE ACCESS POINT ENHANCED FOR SUGGESTED LISTING NAVIGATION filed on May 30, 2019. The content of these applications are incorporated herein by reference, except to the extent that the disclosure therein conflicts with the disclosure herein.

FIELD OF THE INVENTION

The present invention relates to systems and methods for searching, presenting results, and navigating content on a network, e.g. the internet.

BACKGROUND OF THE INVENTION

The transfer of information over computer networks has become increasingly important to institutions, corporations, and individuals that do business. Computer networks have grown over the years from independent and isolated entities established to serve the needs of a single group into vast internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet.

The Internet has emerged as a large community of electronically connected users located around the world who readily and regularly exchange significant amounts of information. The Internet continues to serve its original purposes of providing for access to and exchange of information among government agencies, laboratories, and universities for research and education. In addition, the Internet has evolved to serve a variety of interests and forums that extend beyond its original goals. In particular, the Internet is rapidly transforming into a global electronic marketplace of goods and services as well as of ideas and information.

Current models for generating web site traffic, such as banner advertising, follow traditional advertising paradigms and fail to utilize the unique attributes of the Internet. In the banner advertising model, web site promoters seeking to promote and increase their web exposure often purchase space on the pages of popular commercial web sites. The web site promoters usually fill this space with a colorful graphic, known as a banner, advertising their own web site. The banner may act a hyperlink a visitor may click on to access the site. Like traditional advertising, banner advertising on the Internet is typically priced on an impression basis with advertisers paying for exposures to potential consumers. Banners may be displayed at every page access, or, on search engines, may be targeted to search terms. Nonetheless, impression-based advertising inefficiently exploits the Internet's direct marketing potential, as the click-through rate, the rate of consumer visits a banner generates to the destination site, may be quite low. Web site promoters are therefore paying for exposure to many consumers who are not interested in the product or service being promoted, as most visitors to a web site seek specific information and may not be interested in the information announced in the banner. Likewise, the banner often fails to reach interested individuals, since the banner is not generally searchable by search engines and the interested persons may not know where on the web to view the banner.

Furthermore, publishers of webpages and websites often want to, or need to, gain revenue from their hosted internet materials. Often the best way to monetize a website is to sell advertisement space thereon. However, the advertisements placed often fail to reach the correct or ideal audience. Moreover, the advertisements are usually for products or goods that draw little interest from those who view them. For example, it is commonplace for an individual viewing a webpage to see advertisements for automobiles, loans, toiletries, or article of clothing for which the individual has little to no interest in seeing, let alone purchasing. Additionally, it is undesirably commonplace for advertisements on websites to lead users to a webpage for the product, but the product is out of stock, discontinued, outdated, not available in nearby stores, long shipping times, or not offered from the best sellers of the product.

Even though targeted advertising via the internet is nothing new, however the implementation is still imperfect. Targeted advertising is done by and facilitated by numerous companies, such as, Google, Apple, and Samsung. However, the targeted advertising done is very simplistic, and disregards the privacy concerns of users. For example, a company may gain data on a user that the user wants to go skiing for vacation, or that the user has shown interest in purchasing a new appliance, and the company will display ads for high priced professional skis out of the user's price range, and an appliance that is for sale from a seller that has a fourteen day shipping period whereas an alternative seller's shipping period would of only been five days. Furthermore, how the companies gather and store data and information pertaining to users for targeted advertising can easily be considered an invasion of privacy by many people's standards.

Therefore, there is a need for a way to provide quick, simplistic, relevant, accurate, and sometimes personal advertisements to users on a network, and one that does so without a user having to worry about an invasion of privacy.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a computer-implemented system to determine and display advertisements to a user of a remote computer that is in communication with a network. The system may include one or more servers, a data store, a processor, a controller, a predefined matching keyword database, a product listing advertisement (PLA) database, and a matching unit. The servers may be in communication with a network. The predefined matching keyword database and the PLA database may be stored on the data store. The matching unit may be in communication with the controller.

The matching unit may access data included in the data store. The matching unit may receive a partial query term that may of been inputted into a search access point at the remote computer. The partial query term may be defined as a part of whole query term. The matching unit may match the partial query term to the predefined matching keyword database to create a list of matching keywords. The matching unit may perform a keyword relevancy process on the list of matching keywords to define a matched keyword relevancy.

The matching unit may create a list of top matched keywords based upon the matched keyword relevancy. The matching unit may match the top matched keywords to the PLA database to create a list of associated listings. The matching unit may perform an associated listing relevancy process on the list of associated listings to define an associated listing relevancy. The matching unit may create a list of top associated listings based upon the associated listing relevancy. The matching unit may send the list of top associated listings to display one or more advertisement elements in a matched keyword results zone which may be upon receipt of the partial query term and prior to completion of entry of the whole query term. The matched keyword results zone may be adjacent the search access point at the remote computer.

The partial query term may include a character, a word, a phrase, a character string, an image, a file, a video, a sound, and/or a form of natural language. The keyword relevancy process may define a matched keyword relevancy using one or more factors. The factors may include user factors, advertiser factors, product factors, middleman factors, and/or rule factors. The factors may be received by the matching unit from a client server and/or a third party data store that may be communication with the network.

The associated listing relevancy may be defined using one or more factors. The factors may include user factors, advertiser factors, product factors, middleman factors, and/or rule factors. The factors may be received by the matching unit from a client server and/or a third party data store that may be in communication with the network. Matching unit may exclude matching keywords in the list of matching keywords when creating the list of top matched keywords, which may be based on a keyword relevancy score below a predetermined value. The advertisement elements may include a brand title, brand text, offer card, and/or product card.

A method aspect of an embodiment of the present invention may be directed to a computer-implemented method to determine and display advertisements to a user of a remote computer in communication with a network. The method may use one or more servers, a data store, a processor, a controller, a predefined matching keywords database, a product listing advertisement (PLA) database, and a matching unit. The servers may be in communication with a network. The predefined matching keywords database may be stored on the data store, and the (PLA) database may be stored on the data store. The matching unit may be in communication with the controller. The matching unit may access data included in the data store.

The method may include receiving a partial query term input into a search access point at the remote computer. The partial query term may be defined as a part of a whole query term. The method may include matching the partial query term to the predefined matching keywords database to create a list of matching keywords. The method may further include performing a keyword relevancy process on the list of matching keywords to define a matched keyword relevancy. The method may yet further include creating a list of top matched keywords that may be based upon the matched keyword relevancy.

The method may include matching the top matched keywords to the PLA database to create a list of associated listings. The method may further include performing an associated listing relevancy process on the list of associated listings to define an associated listing relevancy. The method may yet further include creating a list of top associated listings based upon the associated listing relevancy. The method may include sending the list of top associated listings to display at least one advertisement element in a matched keyword results zone adjacent the search access point at the remote computer, which may be upon receipt of the partial query term and prior to completion of entry of the whole query term.

The partial query term may include a character, a word, a phrase, a character string, an image, a file, a video, a sound, and/or a form of natural language. The step of performing the keyword relevancy process to define the matched keyword relevancy may further comprise using one or more factors. The factors may include user factors, advertiser factors, product factors, middleman factors, and/or rule factors. The factors may be received by the matching unit from a client server and/or a third party data store that may be in communication with the network.

The step of defining an associated listing relevancy may further comprise using one or more factors. The factors may include user factors, advertiser factors, product factors, middleman factors, and/or rule factors. The factors may be received by the matching unit from a client server and/or a third party data store that may be in communication with the network. The step of creating the list of top matched keywords based upon the matched keyword relevancy may further include the matching unit excluding matching keywords in the list of matching keywords, which may be based on a keyword relevancy score below a predetermined value. The advertisement elements may include a brand title, brand card, offer card, and/or a product card.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
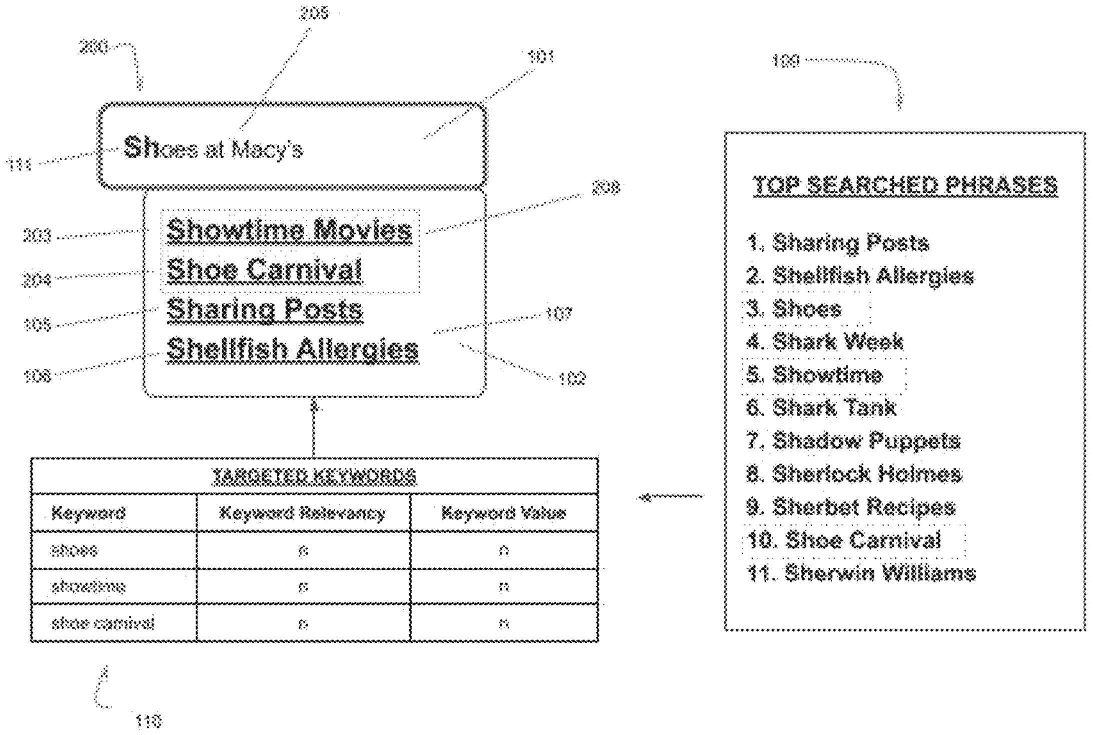
FIG. 1 is a schematic flow chart illustration according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While several methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "sensor" includes one, two, or more sensors.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as “top,” “bottom,” “front,” “back,” “left,” “right,” “up,” “down,” “upper,” “lower,” “inner,” “outer,” “internal,” “external,” “interior,” “exterior,” “proximal,” “distal” and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within said embodiment. In addition, reference to a specific benefit, advantage, problem, solution, method of use, etc. in relation to one embodiment should not be construed as being limited to applications only within said embodiment.

For the purposes of the present invention, the terms “ad,” “ads,” “advertisement,” “advertiser,” and “associated element(s)” may be defined similarly and be used interchangeably. It should be understood that each of these terms may be defined to mean an advertiser, an advertisement for an advertiser, an advertisement by an advertiser, an advertisement for a product/good/service, or a hyperlink that lands a user to a landing page for an advertiser, product, good, and/or service. It should also be understood, that for the purposes of the present invention, the terms “advertiser,” “seller,” “merchant,” “company,” “organization,” and “corporation,” may be defined similarly to mean an entity with a goal to sell something to one or more consumers.

For the purposes of the present invention, it should be understood that whenever it is mentioned that a seller, merchant, third party, or otherwise may pay before, during, or after an embodiment of the present invention performs for them, that payment may be done at any time by any medium of exchange as agreed to by any agreed to terms. Such as, without limitation, a pay-per-click option so that the party only need to pay if an ad for that party that has been placed by an embodiment of the present invention has been clicked on/generating activity/getting attention by/from users/consumers.

The headings used herein are for organizational purposes only and are not meant to be used to limit the scope of the description or the claims. To facilitate understanding, like reference numerals have been used, where possible, to designate like elements common to the figures.

Embodiments of the invention, as shown and described by the various figures and accompanying text, provides a search engine access point that is enhanced for suggested listings. The search engine access point may be empowered to match the input text to any list of relevant terms, and, from there, to match the relevant terms to targeted keywords using a computer implemented process that establishes each keyword’s relevancy score based on historical performance and/or estimated/predefined values.

FIG. 1 illustrates features of an embodiment of the invention where the input text characters 111 may be compared against a list of targeted keywords 110 based on a computer implemented process that combines keyword relevancy with keyword value that, as an example, may be partially influenced by top searched phrases 109. While this embodiment displays the first three matched terms based on the targeted keyword match, any number of displayed matches are available depending on the search engine box 101 and the matched results text box 102. This embodiment illustrates the configuration possibilities of the embodiments.

FIG. **2*a* is a flow chart illustrating features of an embodiment of the invention whereby a search engine 100 may include a search box 101 structured to receive input text 111 typed by a user of the search engine 100. As illustrated, once a user begins typing, a matched keyword results box 102 may appear below the search box 101 with options for the user to input a selection into the search box 101 that is based on top matched keywords and matched keyword relevancy results of the current, incomplete/partial search term instead of typing a complete search term. As shown, a user may utilize their mouse pointer 107** to select a suggested result. Likewise, a user may simply hover over a suggested advertising result and press the enter button on their keyboard to select the hovered term as their operative input. Those skilled in the art will appreciate that arrow keys on a keyboard, or any other user input device, can also be used to select one of the suggested advertising results.

Also shown in the flow chart is a list of top searched phrases 109 and a list of top bidding advertisers 110. These lists are a visual representation of backend database examples and are not shown to the user. Each of these lists may be maintained in a single database or separate databases to be referenced and cross referenced by the search engine 100. By way of non-limiting example, FIG. **2*a* shows a user beginning to type input text characters 111 as “sh”. Below the search box 101 the matched results text box 102 shows a list of matched terms as options for the user. The matched terms in the example are “Shoes at Macy’s” 103, “Showtime Movies” 104, “Sharing Posts” 105 and “Shell Fish Allergies” 106. The terms within this results text box 102** are a combination of both organically produced relevant search terms and process-matched, search terms.

The process-matched search terms are "Shoes at Macy's" 103 and "Showtime Movies" 104, for example. The organically produced relevant search terms are "Sharing Posts" 105 and "Shell Fish Allergies" 106, for example.

In one embodiment, the search engine 100 computer implemented process may compare the input text 111 against the database of top searched phrases 109 to create a list of organically produced relevant search terms. Simultaneously, the input text 111 may be compared against a list of words that Top Bidding Advertisers 110 have bid on. If words/phrases that the Top Bidding Advertisers 110 bid on coincide with the list of organically produced relevant search terms, then the Top Bidding Advertisers 110 words are displayed at the top of the matched results text box 102. The organically produced relevant search terms are shown below them.

Figure 2A:
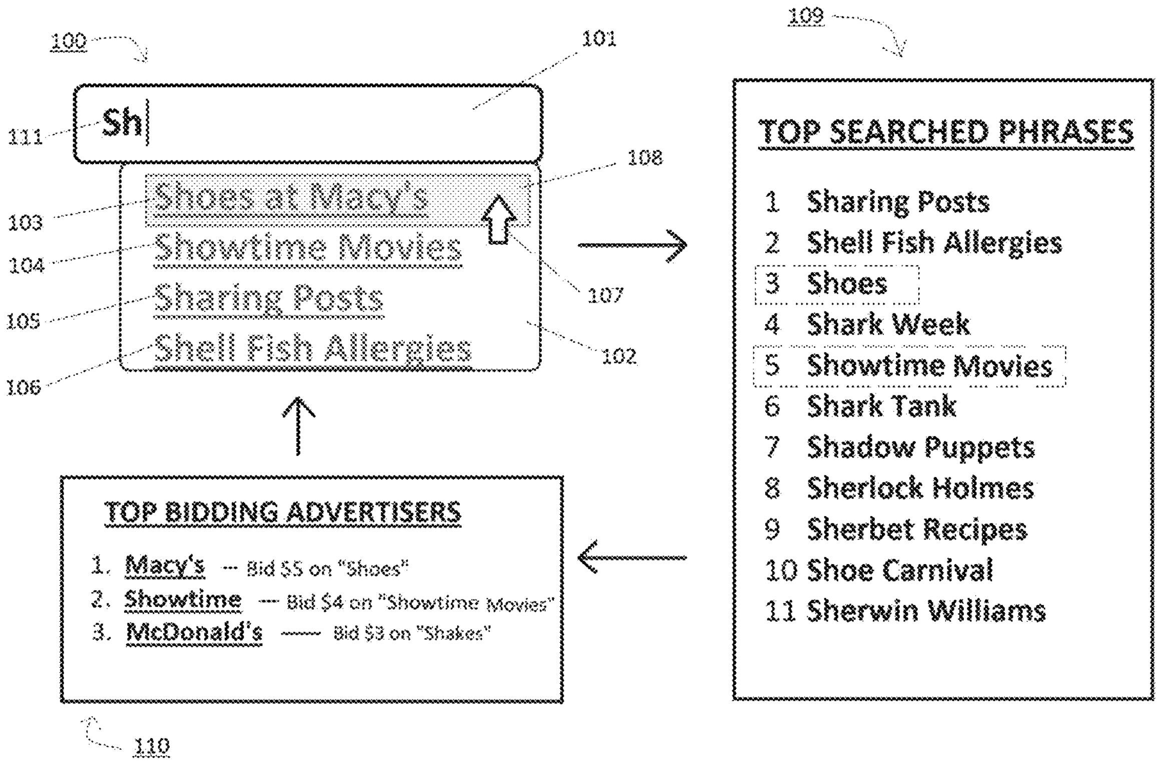
FIG. 2*a* is another schematic flow chart illustration according to an embodiment of the present invention.

In the example shown in FIG. 2*a*, "Macys" was the top bidder at $5 for the term "Shoes". "Showtime" was the second highest bidder at $4 for the term "Showtime Movies" 104. Therefore, even though the database of top searched phrases 109 indicates that in an organic search "Sharing Posts" 105 would normally be at the top of the list and "Shell Fish Allergies" 106 would be second, the search engine 100 computer implemented process places the highest and most relevant bidder, Macy's, in the first matched text position and the second highest bidder, Showtime, in the second matched text position. The top two organically produced search terms "Sharing Posts" 105 and "Shell Fish Allergies" 106 are then placed, below the process-produced results, in the third and fourth position in the matched results text box 102. Since the term "Shakes" did not show up in the database of top searched phrases 109, McDonald's did not have a term appear within the suggested/predictive/auto-completing results text box 102, for example.

Figure 2B:
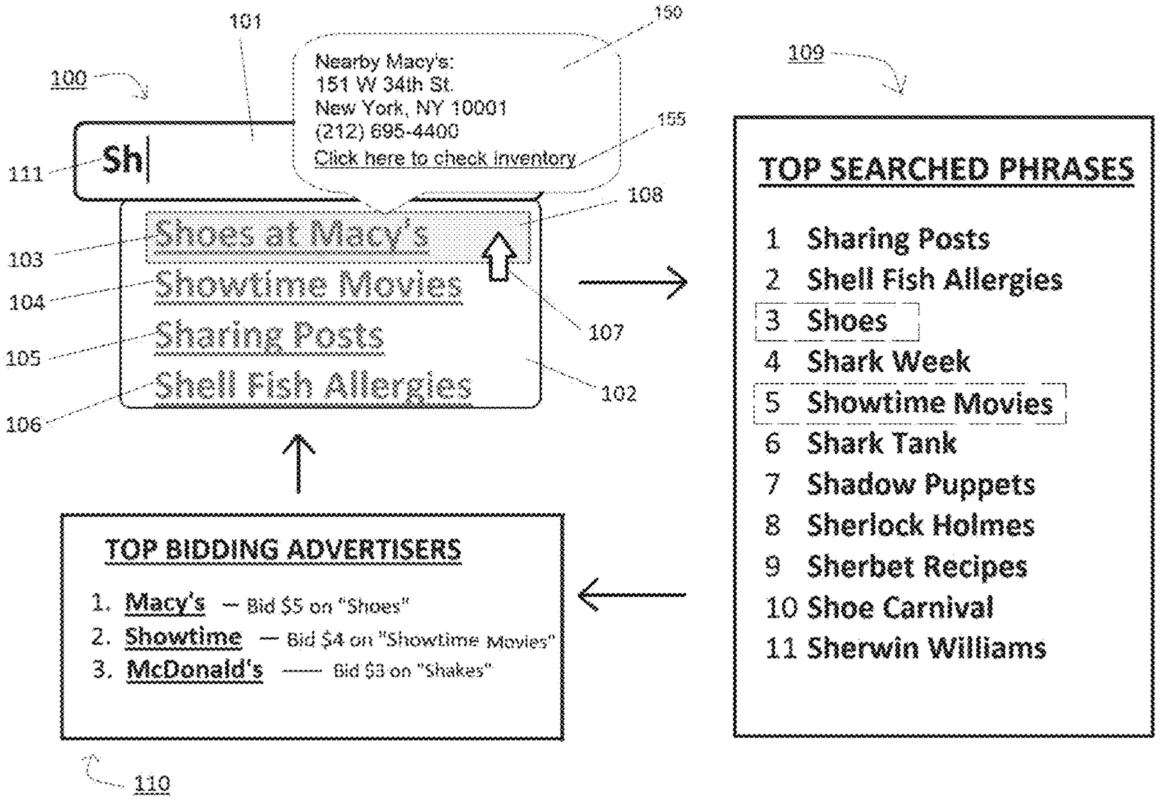
FIG. 2*b* is another schematic flow chart illustration according to an embodiment of the present invention.

FIG. 2*b* illustrates features of an embodiment where the IP address of a user may be used to identify a geographic location. That geographic location may be cross-referenced with the closest physical address associated with the top bidder. FIG. 2*b* is an example illustrating the geographic information within a pop-up 150 depicting top bidder "Macys" with a physical address of "151 W 34th St., New York, NY 10001, (212) 695-4400". There also may be an inventory link 155 to check inventory of the searched item. The inventory link 155 may be linked to a list of items the merchant would like associated with the search term. In some embodiments, these items may be stored in the search engine 100 database. In other embodiments, these items may be located on the merchant's own page. In some embodiments, a user may be able to place one of these items on hold for delivery or pickup, for example.

If the items associated with the inventory link 155 are on the search engine 100 database, then the search engine 100 may communicate a user's desire to order a particular item through an Application Program Interface (API).

Figure 3:
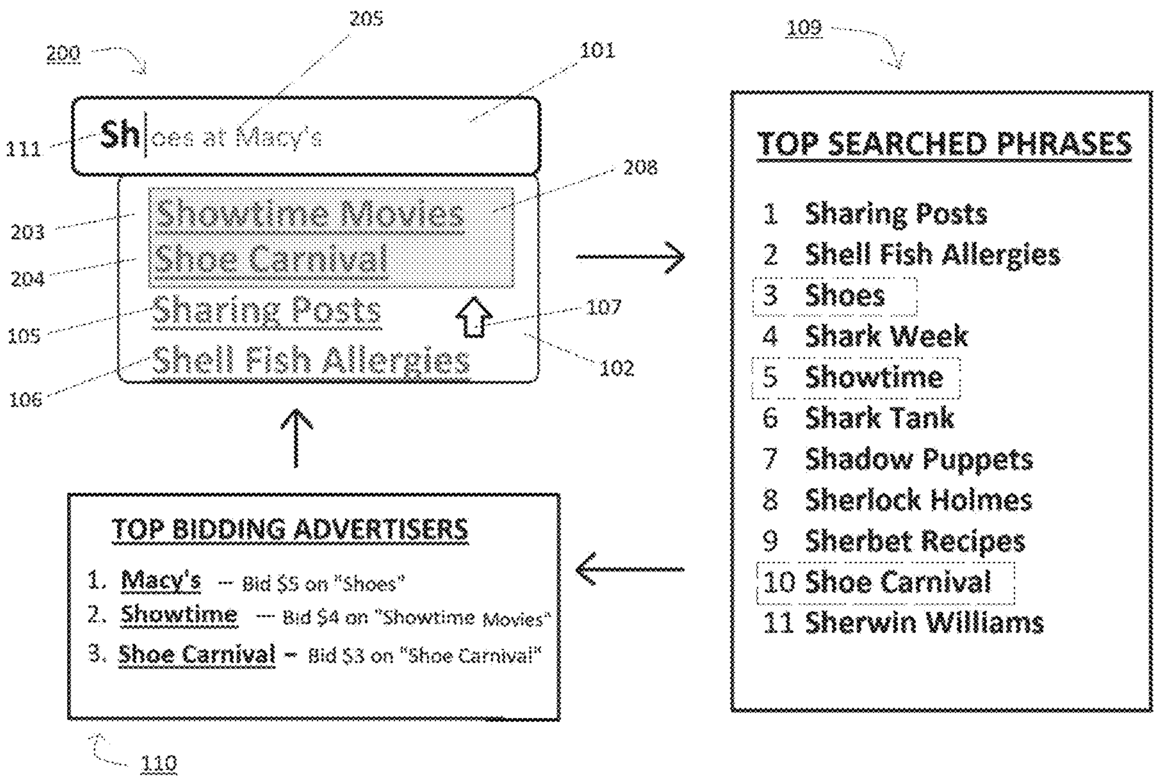
FIG. 3 is another schematic flow chart illustration according to an embodiment of the present invention.

FIG. 3 illustrates another embodiment whereby the highest bidding advertiser has its term placed inside the search box 101 in which the user is typing. In this embodiment, the user may only need to perform a single action (a mouse click or pressing a key on the keyboard, for example) to select the highest bid term. By way of non-limiting example, FIG. 3 illustrates that since Macy's was the highest bidder, the phrase "oes at Macy's" 205 appears as the top matched result within the search box 101 for the user when the input text 111 is "sh". Since Showtime was the second highest bidder at $4 on the phrase "Showtime Movies" 203 and Shoe Carnival was the second highest bidder at $3 with the phrase "Shoe Carnival" 204, those terms appear below the search box 101 in the matched results text box 102.

Since "Showtime Movies" 204 was the second highest bid term, it may be placed in the first position within the matched results text box 102. Likewise, since "Shoe Carnival" 204 was the third highest bid term, it may be placed in the second position within the matched results text box 102. In some embodiments the search engine 200 may highlight 208 the process-matched search terms within the first two positions of the matched results text box 102. This may distinguish those terms as conspicuous choices for the user. Likewise, the most relevant terms can be highlighted, which may also distinguish those terms as conspicuous choices for the user.

In some embodiments, a premium may be paid by the bidders to distance themselves from the competition (i.e., make their terms more "relevant" for matching purposes). By way of non-limiting example, top bidder Macy's in FIG. 3 could have placed a distance bid of $2 on a particular search term or stem. In this example, the matched result for the user's competition would be knocked down by at least one position if the competitor did not also place a distance bid themselves. In cases where more than one bidder placed a distance bid on a particular word, phrase, or stem, the top bidding distance bid combined with the top bidder for the search term may prevail.

In other embodiments, a user may have the ability to price shop between two different stores. In this embodiment, a retailer that may be closer in geographical location to the user may be able to price match a lower competitor within a certain geographical range, e.g. 10 miles.

In other embodiments, the search engine 100 may be enabled to crawl a user's social media to identify key words relevant to the user's search. In this embodiment, the search engine 100 may cross reference the key words found from the social media page with pre-bid terms. Terms that have the highest bid that correlate with a user's social media key words may be boosted in the search results.

Figure 4:
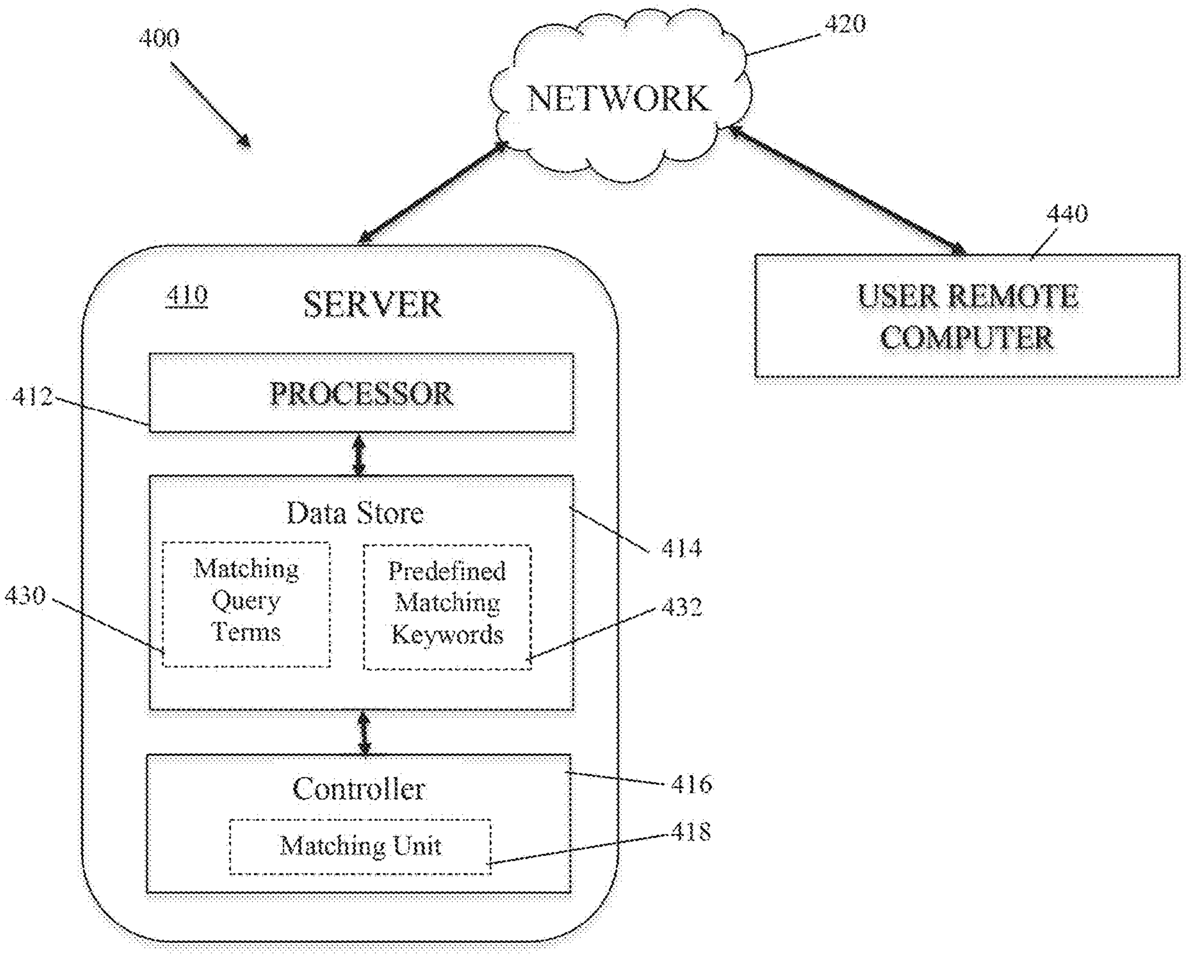
FIG. 4 is a schematic illustration of a computer-implemented system according to an embodiment of the present invention.
Figure 5:
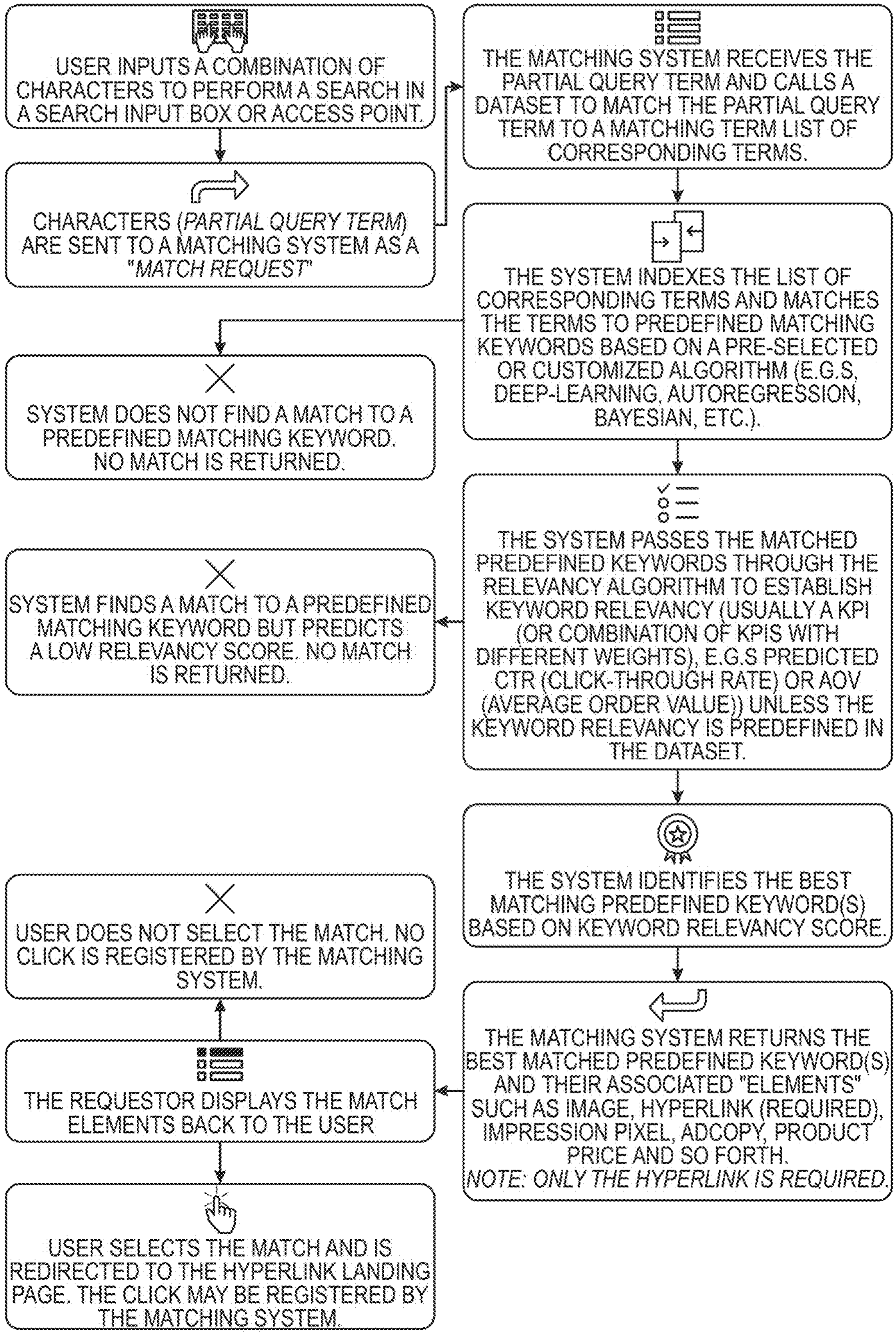
FIG. 5 is a flow chart illustration of a method for performing a search operation according to an embodiment of the present invention.
Figure 6:
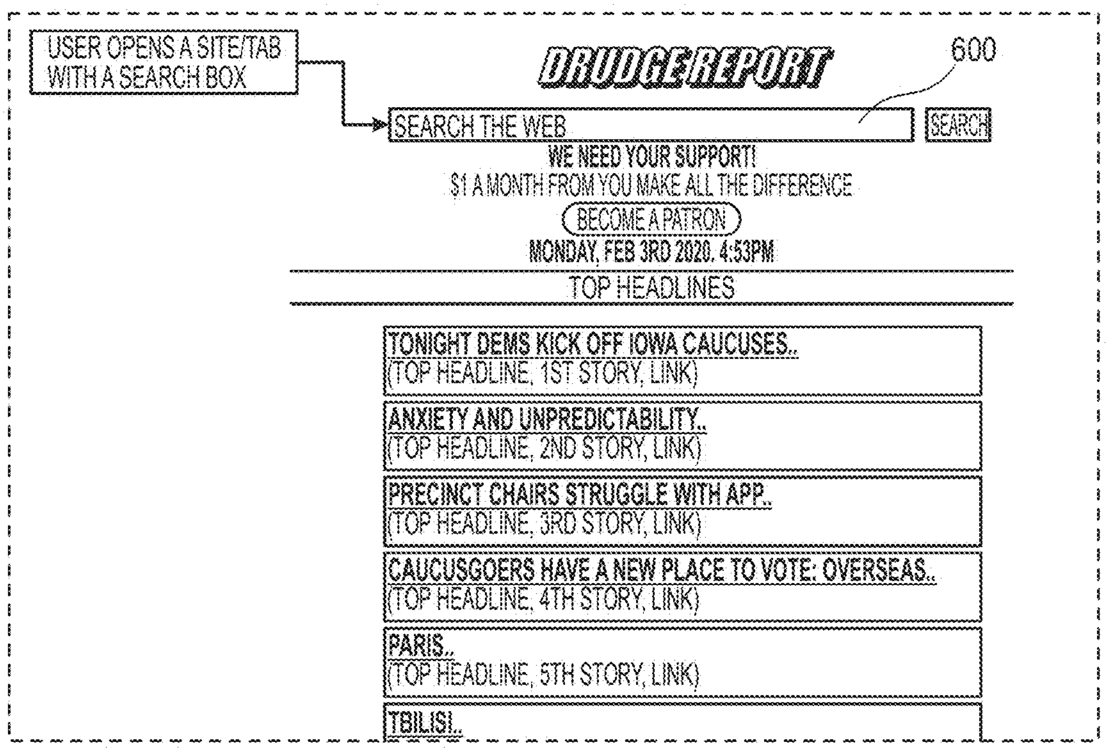
FIG. 6 is a schematic illustration of a user interface showing a search access point according to an embodiment of the present invention.
Figure 7:
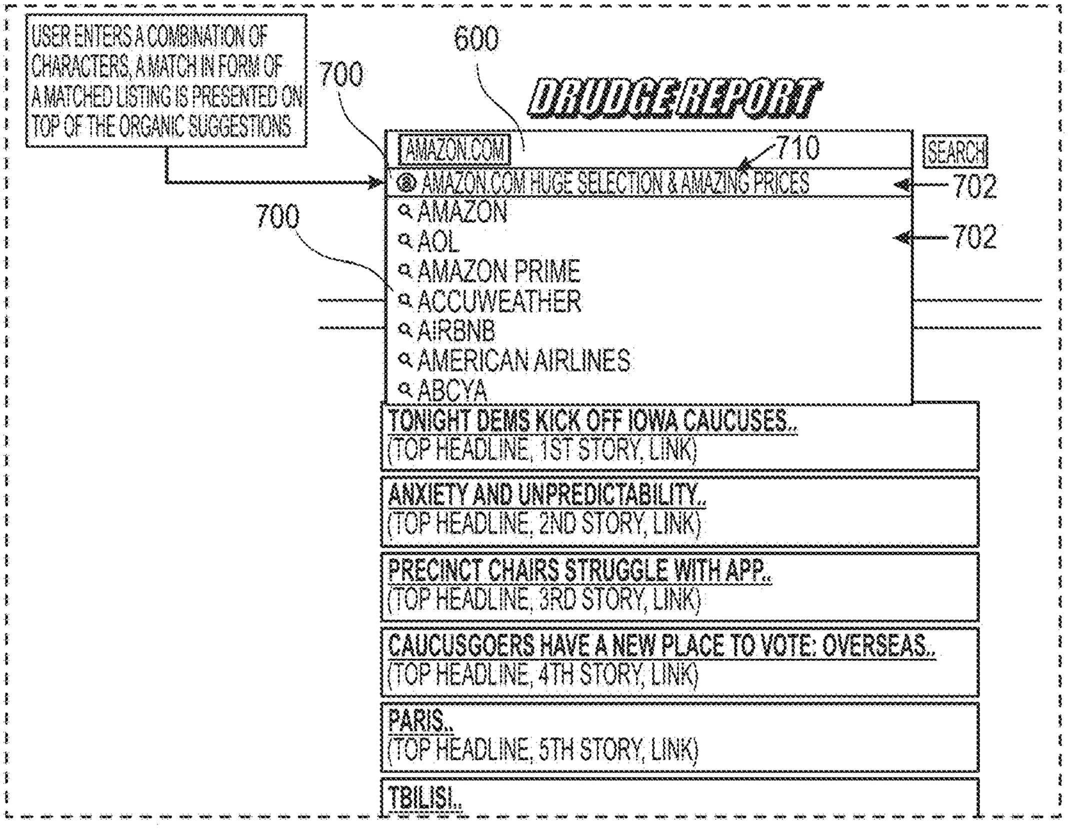
FIG. 7 is another schematic illustration of the user interface of FIG. 6.
Figure 8:
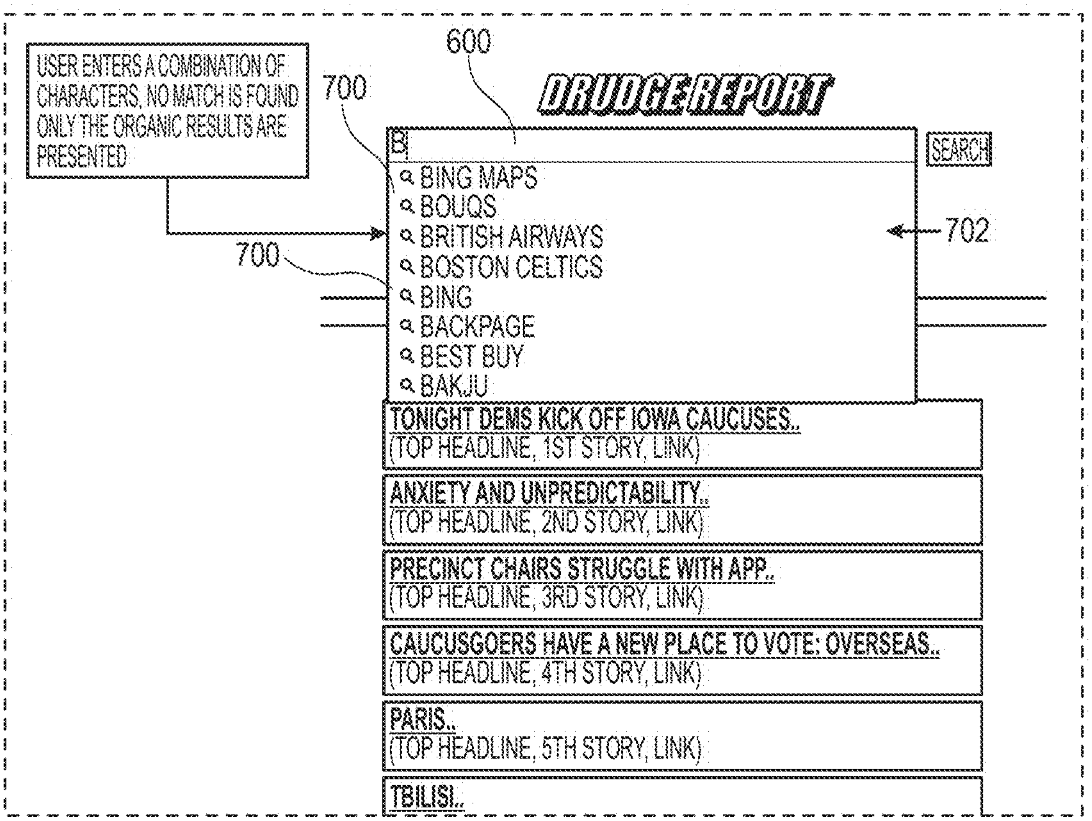
FIG. 8 is another schematic illustration of the user interface of FIG. 7.

With reference to FIGS. 4-8, other embodiments of the present invention will be described. FIG. 4 is a schematic block diagram illustrating a computer-implemented system to perform a search operation in accordance with features of the present invention. FIG. 5 is a flowchart illustrating the example steps of a method to perform a computer-implemented search operation in accordance with features of the present invention. FIGS. 6-8 are example screenshots of a user interface illustrating features of the present embodiments.

A computer-implemented system 400 performs a search operation. A search engine is an information retrieval system designed to help find information stored on a computer system. The search results are usually presented in a list and are commonly called hits. Search engines help to minimize the time required to find information and the amount of information which must be consulted, akin to other techniques for managing information overload. The most public, visible form of a search engine is a Web search engine which searches for information on the World Wide Web Search engines provide an interface to a group of items that enables users to specify criteria about an item of interest and have the engine find the matching items. The criteria are referred to as a search query. In the case of text search engines, the search query is typically expressed as a set of words that identify the desired concept that one or more documents may contain. Some text search engines require users to enter two or three words separated by a space, other search engines may enable users to specify entire documents, pictures, sounds, and various forms of natural language. Some search engines apply improvements to search queries to increase the likelihood of providing a quality set of items through a process known as query expansion. Query understanding methods can be used as standardize query language.

The list of items that meet the criteria specified by the query is typically sorted or ranked. Ranking items by relevance (from highest to lowest) reduces the time required to find the desired information. Probabilistic search engines rank items based on measures of similarity (between each item and the query, typically on a scale of 1 to 0, 1 being most similar) and sometimes popularity or authority or use relevance feedback. Boolean search engines typically only return items which match exactly without regard to order.

To provide a set of matching items that are sorted according to some criteria quickly, a search engine will typically collect metadata about the group of items under consideration beforehand through a process referred to as indexing. The index typically requires a smaller amount of computer storage, which is why some search engines only store the indexed information and not the full content of each item, and instead provide a method of navigating to the items in the search engine result page. Alternatively, the search engine may store a copy of each item in a cache so that users can see the state of the item at the time it was indexed or for archive purposes or to make repetitive processes work more efficiently and quickly.

Other types of search engines do not store an index. Crawler, or spider type search engines (a.k.a. real-time search engines) may collect and assess items at the time of the search query, dynamically considering additional items based on the contents of a starting item (known as a seed, or seed URL in the case of an Internet crawler). Meta search engines store neither an index nor a cache and instead simply reuse the index or results of one or more other search engine to provide an aggregated, final set of results.

Desktop search tools search within a user's own computer files as opposed to searching the Internet. These tools are designed to find information on the user's PC, including web browser history, e-mail archives, text documents, sound files, images, and video. A variety of desktop search programs are available. Most desktop search programs are standalone applications. Desktop search products are software alternatives to the search software included in the operating system, helping users sift through desktop files, emails, attachments, and more.

Enterprise search is the practice of making content from multiple enterprise-type sources, such as databases and intranets, searchable to a defined audience. "Enterprise search" is used to describe the software of search information within an enterprise (though the search function and its results may still be public). Enterprise search can be contrasted with web search, which applies search technology to documents on the open web, and desktop search, which applies search technology to the content on a single computer. Enterprise search systems index data and documents from a variety of sources such as: file systems, intranets, document management systems, e-mail, and databases. Enterprise search can be seen as a type of vertical search of an enterprise.

Search engine marketing (SEM) is a form of Internet marketing that involves the promotion of websites by increasing their visibility in search engine results pages (SERPs) primarily through paid advertising. SEM may incorporate search engine optimization (SEO), which adjusts or rewrites website content and site architecture to achieve a higher ranking in search engine results pages to enhance pay per click (PPC) listings. Search engine marketing is a way to create and edit a website so that search engines rank it higher than other pages. It may be also focused on keyword marketing or pay-per-click advertising (PPC). The technology enables advertisers to bid on specific keywords or phrases and ensures ads appear with the results of search engines.

With the development of this system, the price is growing under a high level of competition. Many advertisers prefer to expand their activities, including increasing search engine results and adding more keywords. The more advertisers are willing to pay for clicks, the higher the ranking for advertising, which leads to higher traffic. PPC comes at a cost. The higher position is likely to cost $5 for a given keyword, and $4.50 for a third location. A third advertiser may earn 10% less than the top advertiser while reducing traffic by 50%, for example.

The system 400 includes at least one server 410, coupled in communication with a network 420. The system includes a processor 412, a data store 414, and a controller 416 having a matching unit 418. The matching unit 418 is configured to access data included in the data store 414, the data store defining a database 430 of matching query terms and a database 432 of predefined matching keywords. The matching unit 418 is configured to receive a partial query term entered into a displayed search access point 600 (e.g., FIG. 6) at a remote computer 440 connected in communication with the network 420, each partial query term comprising at least one character that is input into the search access point 600 via a user input device of the remote computer 440.

The matching unit 418 is configured to match the partial query term to the database 430 of matching query terms to create a list of corresponding matching terms. The matching unit 418 is configured to match the corresponding matching query terms to the database 432 of predefined matching keywords to define matched keywords. The matching unit 418 is further configured to perform a relevancy process on the matched keywords to define a matched keyword relevancy, and then determine top matched keywords based upon the matched keyword relevancy. The matching unit 418 is configured to send a listing 702, that at least includes respective elements associated with the top matched keywords, to be displayed in a matched keyword results zone 700, adjacent the displayed search access point 600, at the remote computer 440. The respective associated elements of each listing 702 at least include a hyperlink 710 to a landing location, and the hyperlinks are selectable at the remote computer 440 via the user input device.

The displayed search access point 600 may be associated with a search engine for the Internet and/or a search appliance for a database.

The matching unit 418 may be configured to index the list of corresponding matching query terms to match the corresponding matching query terms to the database 432 of predefined matching keywords. The matching unit 418 may be further configured to perform the relevancy process on the matched keywords to define the matched keyword relevancy using a predefined keyword relevancy ranking, and then determine the top matching keywords based upon the matched keyword relevancy. The matching unit 418 may be further configured to perform the relevancy process on the matched keywords to define the matched keyword relevancy using a Key Performance Indicator (KPI), and then determine the top matching keywords based upon the matched keyword relevancy.

The matching unit 418 may be further configured to perform the relevancy process on the matched keywords to define the matched keyword relevancy using relevancy prediction information, and then determine the top matching keywords based thereon; wherein the relevancy prediction information comprises at least one of time of session, date of session, geo location, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR, Adgroup ID CTR, Adcopy ID CTR, bid price, user device class, search frequency, historical performance, average order value (AOV), and conversion rate (CVR).

The matching unit 418 may perform the relevancy process on the matched keywords to define the matched keyword relevancy as a relevancy score, or exclude matched keywords based upon a relatively low relevancy score. The relevancy score may be defined by bids from relevant advertisers. The relevancy score may be predefined by weights from a data list. The relevancy score may be further defined based upon a geographic location of the remote computer 440. The relevancy score may be further defined based upon an inventory data list from at least one relevant advertiser. The relevancy score may be defined based upon a desirability factor from at least one of the relevant advertisers to distance a desirable matched keyword from at least one undesirable matched keyword.

The associated elements may also include at least one of an ad term, product price, geographical indicator, click URL, image URL, impression URL, brand flag, brand domain and a listing identifier.

With additional reference to FIG. 5, the computer-implemented method performs a search operation as discussed above using the server 410, coupled in communication with the remote computer 440 over the network 420. The method includes storing a database 430 of matching query terms and a database 432 of predefined matching keywords in the data store 414 accessible by the matching unit 418. A user inputs 502 one or more characters in a displayed search access point 600 to perform a search, and the characters are sent 504 to the matching unit 418. The matching unit 418 receives 506 a partial query term entered 502 into the displayed search access point 600 at the remote computer 440 connected in communication via the network 420. Again, each partial query term includes at least one character that is input into the search access point 600.

The method includes matching 508, at the matching unit 418, the partial query term to the database 430 of matching query terms to create a list of corresponding matching terms, and matching, at the matching unit 418, the corresponding matching terms to the database 432 of predefined matching keywords to define matched keywords. If no matches are found, then no match is returned 509. The method 500 includes performing 510, at the matching unit 418, a relevancy process on the matched keywords to define a matched keyword relevancy, and then determine 512 top matched keywords based upon the matched keyword relevancy. If the relevancy is too low (e.g., below a threshold), no match is returned 511.

The method 500 includes sending 514, from the matching unit 418, a listing 702, that at least includes respective elements associated with the top matched keywords, to be displayed 516 in a matched keyword results zone 700, adjacent the displayed search access point 600, at the remote computer 440. The respective associated elements of the listing 702 at least include a hyperlink 710 to a landing location, and the hyperlinks are selectable at the remote computer 440 via the user input device. A user may select 518 a match and is redirected to the hyperlink landing page, for example, while the click is registered by the matching unit 418. Or, the user does not select 520 a match and no click is registered.

The matching unit 418 preferably indexes the list of corresponding matching query terms to match the corresponding matching query terms to the database 432 of predefined matching keywords. The matching unit 418 may perform the relevancy process on the matched keywords to define the matched keyword relevancy using a predefined keyword relevancy ranking, and then determines the top matched keywords based upon the matched keyword relevancy (e.g. at block 510). The matching unit 418 performs the relevancy process on the matched keywords to define the matched keyword relevancy using a Key Performance Indicator (KPI), and then determines the top matched keywords based upon the matched keyword relevancy.

The matching unit 418 may perform the relevancy process on the matched keywords to define the matched keyword relevancy using relevancy prediction information, and then determines the top matching keywords based thereon. The relevancy prediction information may include at least one of time of session, date of session, geo location, keyword match type, keyword class, publisher class, publisher ID, keyword ID, Adgroup ID, Adcopy ID, partial query length, partial query to keyword levenshtein distance, partial query to keyword Jaro similarity, organic ranking, publisher ID Click-Through Rate (CTR), publisher class CTR, keyword class CTR, keyword ID CTR, Adgroup ID CTR, Adcopy ID CTR, bid price, user device class, search frequency, historical performance, average order value (AOV), and conversion rate (CVR).

The matching unit 418 may perform the relevancy process on the matched keywords to define the matched keyword relevancy as a relevancy score 510.

As discussed above, the matching unit 418 may exclude matched keywords based upon a relatively low relevancy score. The relevancy score may be defined by bids from relevant advertisers. The relevancy score may be predefined by weights from a data list. The relevancy score may be further defined based upon a geographic location of the remote computer 440. The relevancy score may be further defined based upon an inventory data list from at least one relevant advertiser. The relevancy score may be further defined based upon a desirability factor from at least one of the relevant advertisers to distance a desirable matched keyword from at least one undesirable matched keyword.

Again, the respective associated elements may also include at least one of ad term, product price, geographical indicator, click URL, image URL, impression URL, brand flag, brand domain and a listing identifier.

Figure 10:
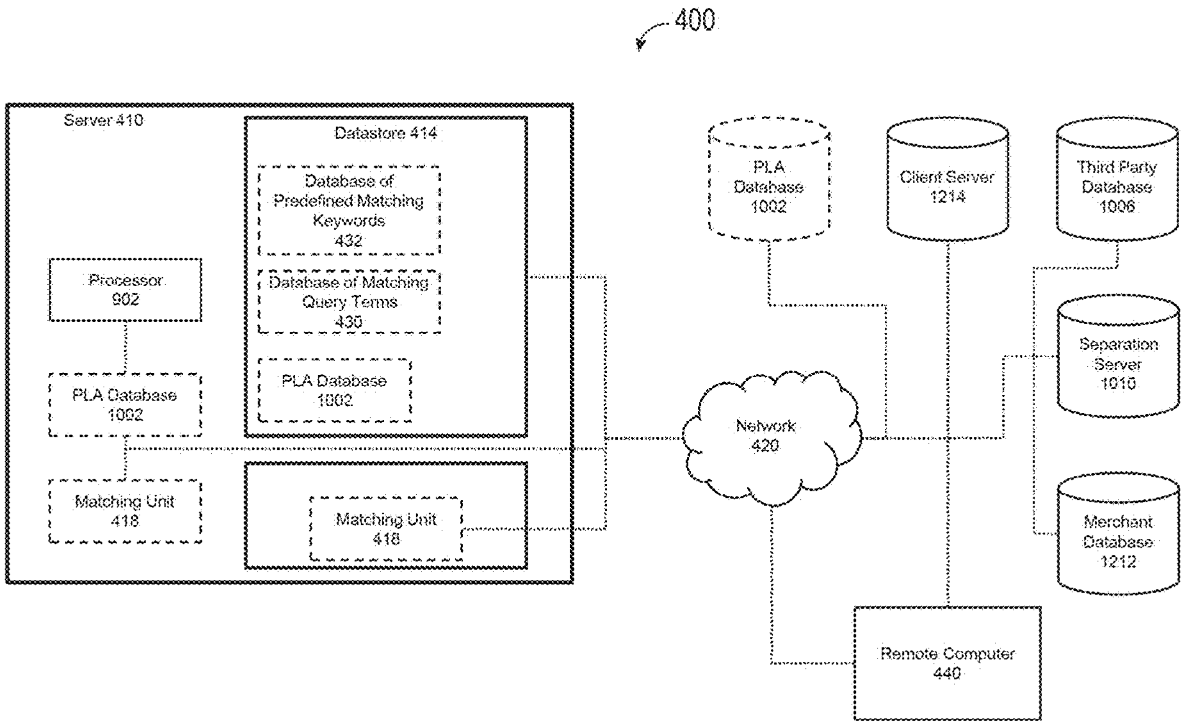
FIG. 10 is a schematic illustration of another computer-implemented system according to an embodiment of the present invention.
Figure 13:
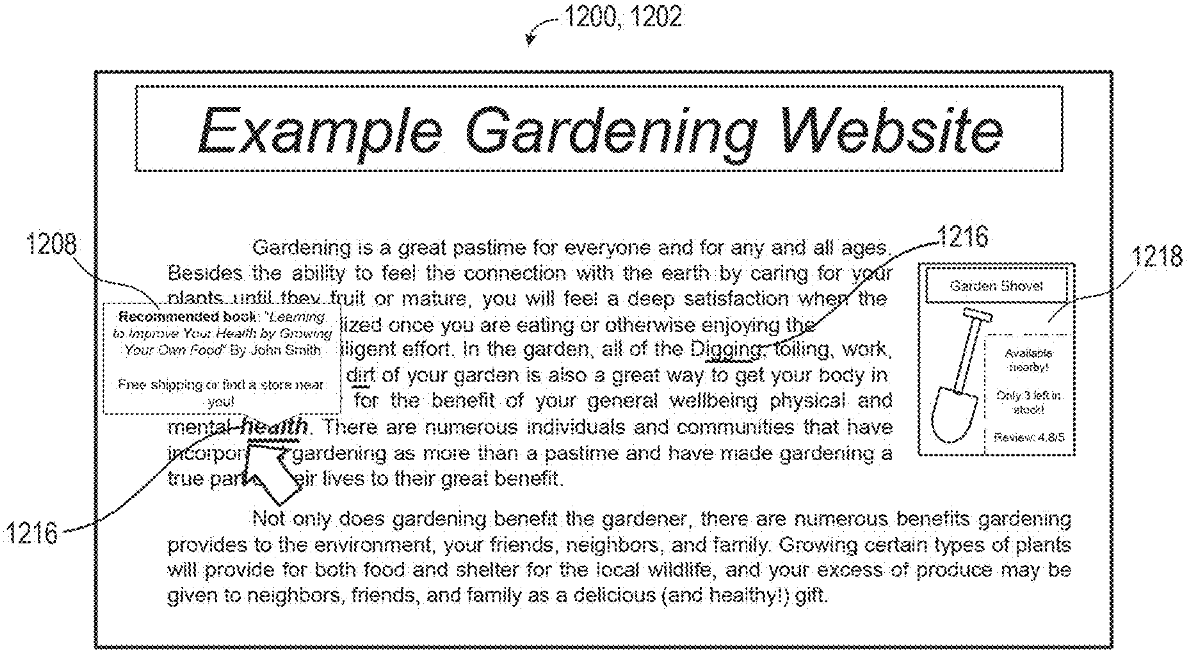
FIG. 13 is a schematic illustration of a webpage having smartlinks and an ad tile according to an embodiment of the present invention.

Now referring to FIGS. 10 and 13, in some embodiments of the present invention the system 400 may be adapted to increase the effectiveness of advertising by determining the relevance of the advertisement that may be displayed to a user via the remote computer 440. The relevancy process performed by the matching unit 418 may be used to determine relevancy for one or more matched keywords, one or more matched advertisers/ads, or one or more matched websites (that may be referred to singly, collectively, or in any combination thereof as “relevancy”), which may be respectively defined as a matched keyword relevancy score, a matched advertiser/ad relevancy score, or a matched website relevancy score (that may be collectively be referred to singly, collectively, or in any combination thereof as "relevancy score"). The relevancy determined by the relevancy process may be determined based on one or more factors including, but not limited to, user factors, advertiser factors, product factors, middleman factors, and rule factors. The system 400 and/or the matching unit 418 may be configured to receive one or more of the factors stored in places that may be third party sources such as, a third party data store 1006, a client server 1214, a product listing advertisement database 1002, and websites 1200.

User factors may include user contextual data, user history, user inputs, and user risk. More specifically, user factors may be defined as including users' geographic location, users' current or upcoming season of weather, web browser being used, users' operating system (OS), users' Internet Protocol (IP) address, internet service provider (ISP), search engine used, users' search history, users' browser history, users' purchase history, users' inputs into a remote computer 440, users' present time of day, users' preferences/tastes, user contextual data, user demographics, user risk, crawled social media data, and/or the same or similar information on one or more users that may have any of the above user factors in common or in contrast. User factors may be concerning a single user, or not concerning a single user (i.e. multiple users).

User demographics may include characteristics of, and/or shared between, multiple users. User demographics may include the user factors listed above as well as other characteristics, such as, without limitation, gender, employment, ethnicity, nationality, physical attributes, age, marital status, ownership statuses (e.g. home, vehicle, and pet ownership), and family/dependents/children status.

User risk may be defined as including, user credit score, user financial history, user legal history, suspicious user activity, risk of user nonpayment, risk of user fraudulent payment, risk of a scam by a user, risk of a user buying-out a product for resale profits, and risk of a user buying a product for illegal activity. User risk may be provided by a third party to be received by the system 400, the data store 414, and/or the matching unit 418 to be used as one of the factors when the matching unit performs a relevancy process to either increase or decrease the relevancy of a product, advertiser, website, and/or advertisement. The user risk may be retrieved from the third party data store 1006, the product listing advertisement database 1002, the client server 1214, and/or websites 1200.

Crawled social media data may be a dataset provided to the matching unit 418 from a third party source the contains information about one or more products present on social media platforms. The dataset may be user specific or directed to more than one user, and it may contain information about the public appeal about a product, one or more users' reaction about a product, the frequency that a product is mentioned by one or more users, and other data that may indicate the popularity of a product for one or more users.

Advertiser factors may include advertiser contextual data, advertiser history, advertiser reputation, and advertiser popularity. Advertiser contextual data may be defined as including geographic location of the advertiser, products offered, the types of products offered. Advertiser history may be defined as including numbers of sales over a period of time (e.g. years, months, or weeks), changes in product lines, changes in the types of products offered, and length of time in business. Advertiser reputation may be defined as including general public approval of an advertiser, general public satisfaction with an advertiser, professional reviews of an advertiser, and public reviews of an advertiser. Advertiser popularity may be defined as including the quantity of sales made by an advertiser and the change in the quantity of sales made by an advertiser.

Product factors may include product listing advertisements (PLAs), product price, product deals, geographic location of the product, product shipping availability, product in-store availability, product shipping speed, product restocking information (e.g. restocking capability or restocking speed), product alternatives (i.e. an alternative product for similar but different products), similar product comparison and contrast (i.e. a product that is similar with few differences), product reviews, product popularity, product return rates, product refund rates, product warranties, product guarantees, product availability, product demand, and product supply. Further details on PLAs follow further below.

Middleman factors may include information on one or more websites 1200 where ads may be displayed or hyperlinked. Middleman factors may include, without limitation, website topics, type of website, website user demographics, website reputation, website context (e.g. owner(s), the object (s) of the website(s), quality of the website(s)), website popularity, website engagement rates, website geographic location engagement rates, website and browser ties, website and device ties, and website advertisement feasibility.

Rule factors may include, without limitation, bidding options, price matching options, merchant advertisement lists, data separation features, advertiser price matching, pay-per-click (PPC), advertiser rules, website rules, and merchant rules. Advertiser, website, and merchant rules may be allowed by the system 400 for each respective party to give certain rules to the matching unit 418 when performing any process as mentioned herein. An advertiser, website (owner), or merchant may give rules including what user(s), website(s), advertiser(s), advertisement(s), and/or product (s), which the advertiser, website, or merchant does or does not want to be associated with. Pay-per-click (PPC) is a business model for advertising over the internet where an advertiser will pay a host website for each time the advertiser's ad is clicked upon on that website. The Further details on each of the rule factors follows throughout below.

A product listing advertisements (PLAs) are listings that display updated information on one or more products. PLAs may generally tell information about a product including, quantity, price, location, the seller, shipping options, shipping cost, sales, and stock. PLAs are generally automated listings such that they provide the most up to date information on product(s). Thus, it is advantageous to use PLAs in order to provide the most up to date information on product (s) when advertising. PLAs may be provided to the system 400 and/or the matching 418 from third party sources such as, a third party data store 1006, a client server 1214, a product listing advertisement database 1002, and websites 1200. Further details on PLAs follows further below.

An embodiment of the present invention may provide for a bidding option. The bidding option may allow for individuals (e.g. advertisers, persons, organizations, or companies), in exchange for payment or other agreement, to have an advertisement or the products/goods of the advertiser to be either more closely associated with, or distanced from, certain goods, products, websites 1200, keywords, users, or other advertisers. The bidding option may be used as a factor by the matching unit 418 when performing a relevancy process.

Specifically, the matching unit 418 may be adapted to use the bidding option as a factor when performing any relevancy process mentioned above, below, and herein. For example, without limitation, when performing the relevancy process to determine relevancy for an advertiser's advertisement with the certain good, product, website, keyword, user, or other advertiser. Another more specific example, an advertiser may pay for the bidding option to have a chosen advertisement or hyperlink to be either more relevant with, the most relevant with, less relevant with, or not relevant with a certain good, product, website, keyword, user, advertisement, or advertiser.

In alternative embodiments, the system 400 may include a price matching option. The price matching option may allow for clients to pay money or other agreed upon exchange so that the system 400 may change the price of the client's good(s) so that they match the price of competing goods. For example, if client has paid for the price matching option, and a good offered by that client was to be an ad displayed to a user but for the client's good being more expensive than a similar good by a competitor, then the matching unit may display the ad for the client's good at or below the competitor's price rather than instead displaying an ad the competitor's good. Similarly, if ads for the client's good and competitor's good were to have ads displayed together, the matching unit 418 may display the merchant's good as the same price as the competitor's good.

PLAs may be provided by and/or obtained from sellers, merchants, organizations, distributors, and companies. The PLAs may include data or information pertaining to the products or goods that are held by the seller, merchant, organization, distributor, or company, such as, the price, quantity in stock, location of the product or seller, shipping availability for the product, images of the product, sales for the product, quality of the product, descriptions of the product, and/or other information pertaining to the products held by that seller, merchant, organization, distributor, or company.

In some embodiments, the at least one server 410 and/or the data store 414 of the system 400 may include one or more product listing advertisements (PLAs) databases 1002 and a PLA unit 1004. The PLA database(s) 1002 may also be located on its own or stored within a client server 1214, third party datastore 1006, or the datastore 414 that may be in communication with the network. The PLA unit 1004 may be configured to access, via the network 420, PLAs stored by one or more sellers, merchants, or companies in a third party data store 1006 or a client server 1214. The PLA unit 1004 may also be configured to copy, download, read, compute, translate, index, and/or format, the PLAs. The PLA unit 1004 may also be configured to store the PLAs in the PLA database 1002.

For example, without limitation, the PLA unit 1004 may first access a third party data store 1006 or the client server 1214 via the network 420 and then copy and/or download one or more PLAs stored therein. Then the PLA unit 1004 may read and compute said PLAs so that the PLA unit 1004 may to then translate and/or format the PLAs into a predetermined standardized PLA format, unless the PLA(s) are already in the standard PLA format then no formatting would need to take place. Lastly, the PLA unit 1004 may access the PLA database 1002 and index the formatted PLAs relative to other PLAs stored in the PLA database 1002 using a predetermined PLA index, creating a library of formatted PLAs. Alternatively, the PLA database 1002 may be configured to index the formatted PLA relative to any other PLAs stored in PLA database 1002 after the formatted PLA is received by the PLA database 1002 from the PLA unit 1004, and thus creating a library of formatted PLAs.

The PLA unit 1004 may be configured to periodically access the same third party server/data store 1006 or the client server 1214 at predetermined intervals of time, so that the PLA obtained from that same third party server/datastore 1006 or client server 1214 may be used to update the corresponding PLA stored in the PLA database(s) 1002. Preferably, the PLA databases 1002 comprise low-latency databases and/or to reduce the amount of time required to access and utilize the library of formatted PLAs. This is because the PLA databases 1002 may be storing a library of formatted PLAs containing information on millions of products and increasing the speed at which the PLA databases 1002 may be access and parsed will provide users with a more seamless experience with the most current product information. It is also preferable that the network 420 comprises of a high-speed low-latency network to further reduce the amount of time required to access and utilize the library of formatted PLAs.

For the purposes of the embodiments of the present invention, the structure and function of the PLA unit 1004, as mentioned above and herein, may be equally performed by the processor 902, controller 416, and/or the matching unit 418. Also, for the purposes of the embodiments of the present invention mentioned herein, the structure and function of the PLA database 1002, as mentioned above and herein, may be equally performed by the server 410 and/or the data store 414.

Figure 14:
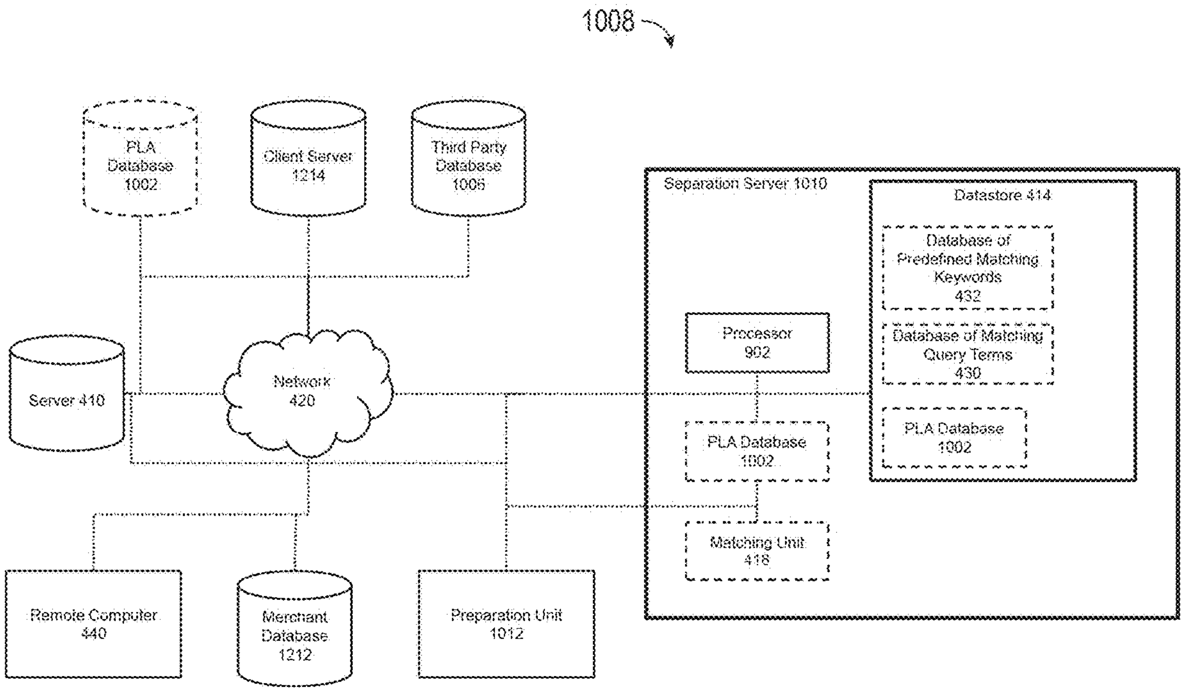
FIG. 14 is a schematic illustration of a data separation feature according to an embodiment of the present invention, and with a preparation unit.

Now additionally referring to FIG. 14, some embodiments of the present invention, the system 400 may include a data separation feature 1008 and a preparation unit 1012. The data separation feature 1008 may include one or more separation servers 1010 that may be in communication with the at least one server 410 via the network 420. The preparation unit 1012 may comprise servers, computational devices, and/or data storage devices. The preparation unit 1012 may be in communication with one or more of the servers 410, the matching unit 418, the datastore 414, the processor 412, and/or the separation servers 1010, which may be via the network 420.

The matching unit 418 and/or the preparation unit 1012 may be configured to periodically generate a library of prepared search queries 1014 comprising of advertisements to be displayed at a user remote computer 440. The advertisements may be pre-matched/associated with various possible partial query terms that may be entered into a displayed search access point 600 by a user. The preparation unit 1012 and/or the matching unit 418 may generate the library of prepared search queries 1014 and may perform a relevancy process as mentioned above and herein. The preparation unit 1012 may also be configured to store the library of prepared search queries 1014. The preparation unit 1012 or the matching unit 418 may be configured to transmit the library of prepared search queries 1014 to the separation servers 1010 via the network 420, and the separation servers 1010 may be configured to store said library of prepared search queries 1014.

The separation servers 1010 may be provided to clients or web-browser companies, and the separation servers 1010 may be configured to be administered, controlled, monitored, and/or managed by the client or web-browser company that the separation server 1010 has been provided to. The separation servers 1010 may be adapted to be integrated with, and/or in communication with, a web-browser system of a web-browser company that includes or uses a search engine 100. The separation servers 1010 may be in communication with the web-browser systems via the network 420. The separation servers 1010 may be adapted to only receive data and information. More specifically, the separation servers 1010 may be adapted to only receive the library of prepared search queries 1014 from the preparation unit 1012 and/or the matching unit 418, and not to send certain data or any data to the preparation unit 1012 and/or the matching unit 418. This is advantageous to maintain the privacy of users of a web-browser that since there would be no outgoing information from the user to the server 410. The separation servers 1010 may be configured to replace or update a previously received library of prepared search queries 1014 with a newly received library of prepared search queries 1014, to maintain the most current library of prepared search queries 1014.

The separation servers 1010 may be configured to operate the same or similar to the servers 410 as mentioned above and herein. Specifically, the separation servers 1010 may also include a processor 412, a datastore 414, and a controller 416 having a matching unit 418 that may each have the same features, functions, connections, communications, configurations, adaptations, and advantages as they are described above, below, and herein by, and contained in, the servers 410.

The datastore 430 of the separation server 1010 may be configured to store the library of prepared search queries 1014 that may be transmitted to the separation server 1010 from the servers 410. The datastore 414 of the separation server 1010 may be configured to replace or update a previously received library of prepared search queries 1014 with a newly received library of prepared search queries 1014, so to maintain the most current library of prepared search queries 1014.

The matching unit 418 of the separation server 1010 may be configured to match the partial query term to the library of prepared search queries 1014 in the datastore 414 of the separation server 1010 to create a list of corresponding matching keywords, to define matched keywords. The matching unit 418 of the separation server 1010 may be further configured to perform a relevancy process on the matched keywords to define a matched keyword relevancy, and then determine top matched keywords based upon the matched keyword relevancy. The matching unit 418 of the separation server 1010 may be configured to send a listing 702, that at least includes respective elements associated with the top matched keywords, to be displayed in a matched keyword results zone 700, adjacent the displayed search access point 600, at the remote computer 440. The respective associated elements of each listing 702 may include a hyperlink 710 to a landing location, and the hyperlinks are selectable at the remote computer 440 via the user input device.

In general, the separation server 1010 may be similar or equivalent to the server 410 as mentioned herein, and may include a processor 412, a data store 414, and a controller 416 having a matching unit 418, along with being in communication with the network 420. The processor 412, data store 414, controller 416, and matching unit 418 may each be adapted to have similar or the same features and advantages as they are described herein. In some embodiments the separation server 1010 may be the same as or similar to the server 410 but may be configured to not send data received from a user at a remote computer 440 to a server 410, so that the user's privacy may be encouraged.

Figure 15:
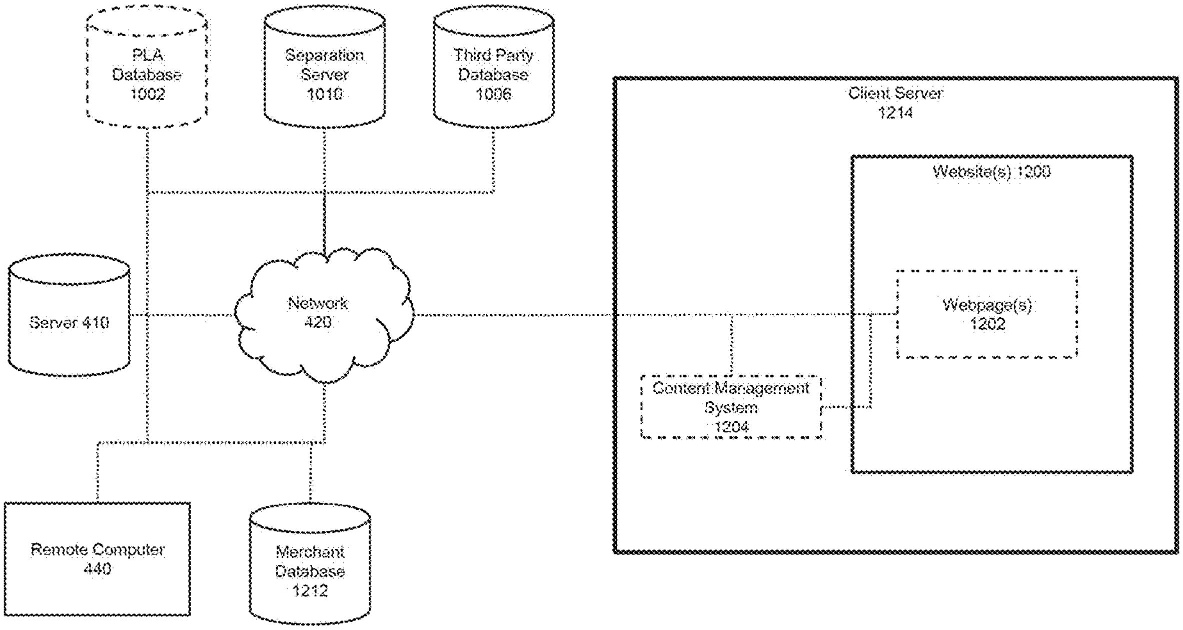
FIG. 15 is a schematic illustration of a client server according to an embodiment of the present invention, showing the client server in communication with the network.

Now additionally referring to FIG. 15, some embodiments of the present invention may include the performing an advertisement creation operation to develop and place ads on a website 1200 and webpage 1202. The matching unit 418 of the server 410 may, via the network 420, be in communication with a website 1200 that may include at least one webpage 1202 and a content management system 1204. The website 1200 may be hosted by a server, such as a client server 1214. For the purposes of the embodiments of the present invention, a website 1200 may be defined as an online platform containing multiple webpages 1202, however, the terms website 1200 and webpage 1202 may be used interchangeably and will be understood to be defined as an online platform containing one or more webpages 1202. The client servers 1214 may be a server or equivalent computer hardware capable of running, hosting, managing, editing, creating, and/or maintaining websites 1200 and/or webpages 1202 on a network. The client servers 1214 may include one or more processors, random access memory, computer readable data storage, volatile or non-volatile computer readable memory, a network interface device, a graphics processing unit, a switch device, a node device, a motherboard, a central processing unit, a microcontroller, a hub device, and any other hardware as understood by those skilled in the art that may be used in a client server 1214.

The content management system 1204 may be the computer hardware and/or computer readable instructions that is included in and/or run by a website 1200 to organize, control, monitor, and/or manage what content is contained in the website 1200. The content managed by the content management system 1204 may comprises advertisements, images, words, terms, videos, sentence strings, hyperlinks, and/or any other content that may be provided by the website 1200.

The webpages 1202 may have at least one term or partial term, including a character, a word, a phrase, a character string, an image, a file, a video, a sound, and a form of natural language. The matching unit 418 may be adapted to parse for terms and/or partial terms on the webpages 1202, and match terms and/or partial terms on the webpages 1202 to the data store 414, to define matched keywords. The matching unit 418 may be configured to perform a relevancy process that may be based on one or more factors, as mentioned above, below, and herein, on each of the matched keywords to determine a matched keyword relevancy, which may be used to define a matched keyword relevancy score, and then determine the top matched advertiser based upon the matched keyword relevancy and/or matched keyword relevancy score for each matched keyword to create a list of matched keywords.

The matching unit 418 may be configured perform the keyword relevancy process based on one or more factors, as defined above and herein, including user factors, advertiser factors, product factors, middleman factors, and rule factors. Specifically, the factors used by the matching unit 418 when performing the relevancy process may include the customer demographics of the website 1200, the contextual data of the customers that visit the website 1200, and crawled social media data on each of the matched keywords.

The matching unit 418 may be further configured to perform a listing relevancy process on each of the top matched keywords to define an associated listing relevancy. The matching unit 418 may be configured to determine and/or associate each top matched keyword with the PLA database, which may be based upon the associated listing relevancy to create a list of associated top matches. The matching unit 418 may be configured perform the listing relevancy process based on one or more factors, as defined above and herein, including user factors, advertiser factors, product factors, middleman factors, and rule factors. Specifically, the factors used by the matching unit 418 when performing the listing relevancy process may include the customer demographics of the website 1200, the contextual data of the customers that visit the website 1200, and crawled social media data on each of the matched keywords.

The matching unit 418 may be configured to perform an advertisement element placement process on the website 1200 to add/create smartlinks 1216 to/with each of the matched keywords/terms, and/or to place ad tiles 1218 on the website 1200. The smartlinks 1216 may comprise links or hyperlinks that may be activated by a user or consumer to direct/land the user to a webpage 1202 of the top matched advertiser associated with the matched keyword/term.

In some embodiments, a smartlink 1216 may comprise of a hyperlink that may be activated by a user, which may then generate a smartlink signal that may be received by the matching unit 418. The smartlink signal may comprise of one or more terms, partial terms, or partial query terms that may be related to the terms of the hyperlink. Upon the matching unit 418 receiving the smartlink signal, the matching unit 418 may perform an associated listing relevancy process to determine the top associated listing with the hyperlink/smartlink 1216. The associated listing relevancy process may include being based upon one or more factors mentions above and herein, to determine the top associated listing. The matching unit 418 may be configured to send a landing page associated with the top associated listing to the user of the remote computer. Those skilled in the art will notice and appreciate that determining the top associated listing and landing page associated with the top associated listing, after a user activates the hyperlink/smartlink 1216 is advantageous to have the most current and relevant listing/advertisement/advertiser's landing page sent to the user, rather than having the listing/advertisement/advertiser determined at some point prior, since the landing page is tailored to the user at that moment, rather than at some prior point in time.

A smartlink 1216 may also include a pop-up ad 1208 that may be passively displayed or actively displayed on or adjacent to the keyword/term with a smartlink 1216. For example, a passively displayed pop-up ad 1208 may be displayed once a user may hovers a pointer, mouse, selector, or similar action/function on or over one of the smartlink 1216 terms containing a pop-up ad 1208 via a remote computer 440. An actively displayed pop-up ad 1208 may be or remain visible adjacent to or on the smartlink 1216 term/keyword without any action or input required from a user visiting the website 1200. The pup-up ad 1208 may comprise of a brand title, brand card, offer card, or product card.

The ad tile 1218 may be an advertisement including at least one of a brand title, brand card, offer card, and product card. The ad tile 1218 may be placed by the matching unit 418, website 1200, or client server 1214 at any position on the website 1200, including above, below, or adjacent to a body of terms, inserted into a body of terms, and overlaying a body of terms. The ad tile(s) 1218 chosen to be placed on a website may be one or more of the top matched listings of an advertiser associated with one or more of the matched keywords including the top matched keywords.

Some embodiments that include the advertisement creation operation may comprise using at least one server 410 in communication with a network. The servers 410 may include a data store 414, a processor 412, a controller 416, and a matching unit 418 that may be in communication with the controller 416. The matching unit 418 may be configured to access data included in the data store 414. A database 432 of predefined matching keywords may be stored on the data store 414, and a product listing advertisement (PLA) database 1002 of present listings of product offers may also be stored on the data store 414.

The matching unit 418 may be configured to parse a website 1200 hosted by client servers 1214 in communication with the network and may receive at least one term therefrom. The matching unit 418 may further be configured to match each of the at least one terms to the database 432 of predefined matching keywords and may create a list of matched keywords therefrom. The matching unit 418 may be configured to perform a keyword relevancy process on the list of matched keywords and may define a matched keyword relevancy therefrom. The matching unit 418 may further be configured to create a list of top matched keywords that may be based upon the matched keyword relevancy.

The matching unit 418 may also be configured to define an associated listing relevancy and may be configured to create a list of associated top matches. The matching unit 418 may further be configured to send the list of associated top matches to the website 1200 to create at least one advertisement element thereon that includes at least one of a smartlink 1216 and an ad tile 1218.

The Ad tile 1218 may be an advertisement including at least one of a brand title, brand card, offer card, and product card. A smartlink 1216 may be a hyperlink or a pop-up ad. A smartlink 1216 may include editing a term and/or keyword so that the term/keyword is a hyperlink to a landing location, such as, without limitation, a landing page for an advertiser that has been associated with the term/keyword. The landing page for the hyperlink may be configured to be determined after a user activates the hyperlink. For example, once a user activates the hyperlink, the matching unit 418 may receive the hyperlinked term and perform a relevancy process on the hyperlinked term, which may be an associated listing relevancy process to develop a top relevant associated listing. The associated listing relevancy process may be based upon one or more factors, including user factors. The matching unit 418 may send the top relevant associated listing to the remote computer 440 to be the landing page viewed by the user.

Some embodiments of the present invention that include the advertisement creation operation may include using a matching unit 418 for use in connection with a computer-implemented system to perform an advertisement creation operation. The matching unit 418 may be positioned in communication with a controller 416 and may be configured to access data included in a data store 414. The matching unit 418 may be further configured to parse a website 1200 that may be hosted by client servers 1214 in communication with a network 420 and may receive at least one term therefrom. The matching unit 418 may be configured to match each of the at least one term to a database 432 of predefined matching keywords to create a list of matched keywords. The matching unit 418 may also be configured to perform a keyword relevancy process on the list of matched keywords to define a matched keyword relevancy. The matching unit 418 may be configured to create a list of top matched keywords based upon the matched keyword relevancy and may define an associated listing relevancy. The matching unit 418 may be configured to create a list of associated top matches and may be further configured to send the list of associated top matches to the website 1200 to create at least one advertisement element thereon that includes at least one of a smartlink 1216 and an ad tile 1218.

The matching unit 418 may also be configured to perform the advertisement creation operation, keyword relevancy process, and/or the listing relevancy process on a website 1200 or webpage 1202 once the matching unit 418 receives a user notification that a user has or requested to land on or access the website 1200 or webpage 1202. The matching unit 418 may be configured to monitor a client server 1214, website 1200, or webpage 1202 to detect when a user has or requested to land on or access the website 1200 or webpage 1202. Alternatively, the client server 1214, website 1200, or webpage 1202 may be configured to send an instant user website access notification to the matching unit 418 to notify the matching unit 418 that a user will or has landed on the website 1200 or webpage 1202. The matching unit 418 may be configured to concurrently perform the advertisement creation operation so that the ads created in the website 1200 or webpage 1202 are kept relevant and/or current. The matching unit 418 may also be configured to use factors, mentioned above and herein, that are specific to the user requesting to land on the website 1200 or webpage 1202 so that the ads created on the page are relevant to that user.

In some embodiments of the present invention, the system 400 may include an advertisement display process. The matching unit 418 may be configured to receive a partial query term that a user inputted into the displayed search access point 600 at the remote computer 440 that may be in communication with the network 420. A partial query term may include one or more characters, one or more words, document(s), picture(s), sound(s), and any form of natural language. The displayed search access point 600 may be associated with a search engine for the Internet and/or a search appliance for a database that may include a search box to enter a query for a search.

The matching unit 418 may be configured to perform an advertisement display process to analyze and match each partial query term after they are each inputted by the user into a search access point 600 that may be at a remote computer 440. The matching unit 418 may be configured to match the partial query term to term(s) with the data store 414, the database 430 of matching query terms, the database 432 of predefined matching keywords, and/or the PLA database 1002 to determine matching keyword(s). The partial query term may be defined as a part of a whole query term. For example, without limitation, a partial query term may be "autom" with the whole query term that the partial query term is a part of is "automobile."

The matching unit 418 may be configured to perform the relevancy process based on one or more factors, as mentioned above and herein, on the matching keywords, to develop a matched keyword relevancy, which may be defined as a matched keyword relevancy score. The matching unit 418 may also be configured to determine the top and/or most relevant matching keyword(s) based upon the matched keyword relevancy and/or the keyword relevancy score. The determined top and/or most relevant matching keyword(s) may be used by the matching unit 418 to create a list of top matched keywords. The matching unit 418 may also be configured to exclude matched keyword(s) from the list of top matched keywords based upon a keyword relevancy score that is below a predetermined value.

The matching unit 418 may be configured to match the top matched keywords in the list of top matched keywords with advertisement listings stored in the PLA database 1002 to create a list of associated listings, with each listing associated with a respective top matched keyword. The matching unit 418 may also be configured to perform an associated listing relevancy process to define an associated listing relevancy. The matching unit 418 may be configured to create a list of top associated listings to display at least one advertisement element in a matched keyword results zone 700 that may be adjacent to the search access point 600 at the remote computer 440.

The matching unit 418 may be configured to perform the advertisement display process each time a partial query term is inputted by the user into a search access point 600, and/or each time when the matching unit 418 has received the partial query term. Specifically, the user does not need to enter the partial query term into the search appliance or search box (i.e. have the search engine of the search access point perform a search) for the matching unit 418 to receive the inputted partial term(s) or term(s), all that may be required is for the user to input a partial query term into the search access point 600 or search appliance, for example, when a character is typed into the search access point 600 via the remote computer 440. Therefore, generally, the matching unit 418 may perform the advertisement display process upon each receipt of a partial query term, and prior to the completion of the entry of the whole query term.

The matching unit 418 may be configured to send a listing 702, that at least includes respective elements associated with the top matched keywords and/or the list of top associated listings, to be displayed in the matched keyword results zone 700, adjacent the displayed search access point 600, at the remote computer 440. The respective associated elements of each listing 702 may include a hyperlink 710 to a landing location (website 1202) of an advertiser that is associated with the top matched keyword(s) and/or the list of top associated listings for the partial query term(s). The hyperlink 710 may be configured to take a user to a landing location (website 1202) that is for a certain product or single advertiser, or a landing location with multiple products or multiple advertisers.

Preferably, the system 400 is set up to allow for fast intake, ingestion, computation, and output such that the ads/respective elements are displayed to users at the remote computer in near real time to a user's input and use of the remote computer. For example, without limitation, to allow for the matching unit 418 when performing the advertisement display process to display the ads/respective elements to a user near instantaneously after each of the user's inputs of a partial query term, such that the system 400 may comprise a low latency database and/or the network 420 may comprise a low latency network 420. The ads/respective elements displayed when the matching unit 418 performs the advertisement display process may include a brand title, brand text, offer card, and/or product card.

Some embodiments of the present invention may be adapted to include performing an advertisement landing page matching operation. For context, an owner or publisher of a website 1200 or webpage 1202 may want to include one or more advertisement therein. The websites 1200 may include websites/webpages for product reviews, content reviews, or user generated content. To solve this problem, the matching unit 418 may be configured to perform an advertisement landing page matching operation on the website 1200 and/or webpage 1202 to find keyword(s) that may be converted into hyperlinks or pop-up ads 1208. Specifically, the matching unit 418 may be adapted perform the advertisement landing page matching operation to parse a website 1200 and/or webpage 1202 to receive term(s) therefrom, and to match the term(s) with the data store 414, the database 430 of matching query terms, the database 432 of predefined matching keywords, and/or the PLA database 1002 to develop a list of matched keyword(s). The terms received by the matching unit 18 from the websites 1200 may include any number of characters, a word, a character string, a file, images, audio, video, and any form of data, information, or natural language.

The matching unit 418 may also be adapted to perform the relevancy process on the list of matched keyword(s) based on one or more factors, as mentioned above and herein, to define a matched keyword relevancy, and may determine a list of relevant keywords based on the matched keyword relevancy. The factors the relevancy process is based on may include, user factors, advertiser factors, product factors, middleman factors, and rule factors. More specifically, without limitation, the factors the relevancy process is based on may include how often a term is mentioned on the website 1200 and webpage 1202, the relative relation between all the terms on the website 1200 or webpage 1202, and the object of the website 1200 or webpage 1202. The matched keyword relevancy may be defined as a matched keyword relevancy score. The matching unit 418 may also be configured to exclude matched keywords based on a relatively low matched keyword relevancy and/or matched keyword relevancy score.

The matching unit 418 may also be adapted to perform another relevancy process on the list of relevant keywords based on one or more factors, as mentioned above and herein, to determine and associate the top/most relatively relevant advertiser for each of the keywords. The matching unit 418 may be configured to add/create a hyperlink and/or smartlink 1216 to/for each matched keyword that lands a user on a webpage 1202 of the advertiser associated with that matched keyword, the matching unit 418 may also be configured to add/create the hyperlink/smartlink 1206 first, and then perform an associated listing relevancy process on the hyperlinked word once a user activates the hyperlink by clicking on the hyperlink. The matching unit 218 may also be configured to add/create a pop-up ad 1208 on each matched keyword for the advertiser associated with that keyword.

In some embodiments of the present invention, the advertisement landing page matching operation performed by the matching unit 418 may include an advertisement display process to place ads that are set apart from the terms on a website 1200 and/or ads that may be actively displayed on the website 1200 (i.e. the ads are displayed to a user viewing the website 1200 or webpage 1202 without any user input or action needed to reveal/display the ad). For example, without limitation, the ads may be placed next/adjacent to, above, or below the terms located on the website 1200. For general context, owners/publishers of websites 1200 and webpages 1202 may require, or have a need to, place ads on their website 1200 or webpage 1202. The websites 1200 may include one or more available plots 1210 that may be an available location to have an ad displayed thereon. The available plots 1210 may be designated by the owner/publisher and/or the available plots 1210 may be found by the system 400, with the ads being chosen by the system 400 and matching unit 418 based on relevancy.

More specifically, the matching unit 418 may be adapted to perform the advertisement display process to parse a website 1200 or webpage 1202 to identify areas of the website 1200 or webpage 1202 in which an ad may be positioned for display, which may define one or more available plots 1210. The matching unit 418 may also be configured to receive identification of available plots 1210 via manual input from the owner/publisher of the website 1200 or webpage 1202, or from an operator of the system 400. The identification of available plots 1210 via manual input from the owner/publisher of the website 1200 or webpage 1202 may be received by the matching unit 418 from a third party data store 1006 or a client server 1214 via the network 420. The advertisement display process performed by the matching unit 418 may include parsing the website 1200 and/or webpage 1202 to receive term(s) therefrom, and to match the term(s) with the data store 414, the database 430 of matching query terms, the database 432 of predefined matching keywords, and/or the PLA database 1002 to develop matching keyword(s).

The advertisement display process performed by the matching unit 418 may also include performing a relevancy process on the matched keyword(s) based on one or more factors, as mentioned above and herein, to determine a matched keyword relevancy, and may generate a listing of relevant matched keywords based on the matched keyword relevancy. The matched keyword relevancy may also be defined by the matching unit 418 as a matched keyword relevancy score.

The advertisement display process performed by the matching unit 418 may also include performing another relevancy process on the listing of relevant matched keywords based on one or more factors, as mentioned above and herein, to determine a matched advertiser relevancy, and associate the top/most relevant advertiser/ad for each of the matched keywords that may be in the listing of relevant matched keywords based on the matched advertiser relevancy. The matched advertiser relevancy may also be defined by the matching unit 418 as a matched advertiser relevancy score.

The matching unit 418 may be configured to fill, add, and/or overlay the ad(s)/advertiser(s) that may be associated with the matched keywords, relevant matched keywords, and/or the keywords in the listing of relevant matched keywords onto the website 1200 or webpage 1202, so that the ad(s) may be displayed for a user at a remote computer 440. The ad(s) may be filled, added, and/or overlaid by the matching unit 418 onto one or more of the available plots 1210. The ad types that may be displayed may include a brand title, brand text, brand card, offer card, and/or product card.

The advertiser(s)/ad(s) to be displayed may be filtered and chosen with a third-party criterion (i.e. the rule factors listed further above) that may be received by matching unit 418 via the network 420 from the third party data store 1006, the client server 1214, the website 1200, the webpage 1202, the content management system 1204, data store 414, or other data storage or computer readable data input device as understood by those skilled in the art.

For example, without limitation, the third-party criterion may include an owner/publisher setting a rule that the website 1200 or webpage 1202 should only display ads that are related to the topic of the website 1200. Another example, without limitation, is that a third-party criterion may include an owner/publisher or advertiser choosing that they do not want to be associated with a certain advertiser/ad, with a certain website 1200, or with a certain topic associated with some ads or websites 1200. The matching unit 418 may be adapted to apply the third-party criterion/rule factors as a relevancy factor when performing a relevancy process and/or during a filtering process separate from the relevancy process to either associate, disassociate, decrease relevancy, or increase relevancy of a keyword, advertiser/ad, website 1200, webpage 1202, or product.

The matching unit 418 may be configured to perform the advertisement landing page matching operation, the advertisement display process, and/or the filtering process at set predetermined times or periodically after the matching unit 418 has already performed one of the processes on a website 1200. This is advantageous and preferable since the ads and hyperlinked keywords may be consistently updated in order to provide the most relevant ads and advertisers for users visiting a website 1200 or webpage(s) 1202, and to apply the most recent rule factors. The matching unit 418 may also be configured to perform the advertisement landing page matching operation, advertisement display process, and/or the filtering process on a website 1200 or webpage 1202 once the matching unit 418 receives a user notification that a user has or requested to land on or access the website 1200 or webpage 1202.

Some embodiments of the present invention may be adapted for performing a merchant promotion process. A merchant, which may be alternatively defined, for the purposes of the present invention, a seller that may have offer(s) for products, goods, or services that may be of a wide variety, and that may be, or may not be, products, goods, or services that are made, produced, or provided directly from the merchant. Such as, without limitation, websites 1200 that allow for users to place an offer to sell goods (e.g. Ebay.com and Amazon.com). The merchants may desire having ads or hyperlinks for the merchant's offer(s), displayed to users. The merchants may also desire for the ads or hyperlinks to be displayed to the most relevant users and on the most relevant websites 1200 (i.e. targeted advertising).

The merchant promotion process may be performed by the matching unit 418 to parse a merchant's website 1200, webpage 1202, merchant database 1212, and/or the PLA database 1002 to receive merchant data that may include information on the products, goods, or services provided by/through the merchant. The merchant promotion process may include the matching unit 418 performing a relevancy process based on the merchant data and one or more factors, as mentioned above and herein, on a plurality of websites 1200 and/or webpages 1202 to develop a merchant relevancy score to generate a merchant advertisement list containing the relevant websites 1200 and/or webpages 1202. The relevancy process may include having the websites 1200 and/or webpages being each associated with a merchant relevancy score.

The relevancy process may more specifically include being based on factors such as website/webpage data and website/webpage visitor data. Website/webpage data may be defined as the content of the website 1200 or webpage 1202, and website/webpage visitor data may be defined as the contextual information, search history, and/or purchase history of the users that visit the websites 1200 and webpages 1202. The merchant advertisement list may contain a list of the most relevant websites 1200 and webpages 1202 to place/display ads and/or hyperlinks for one or more of the merchant's offer(s). The merchant promotion process may further include the matching unit 418 indexing the merchant advertisement list based on the associated merchant advertisement relevancy scores of the listed websites 1200 and webpages 1202.

The merchant advertisement list may be formatted so that each listed website 1200 and webpage 1202 is displayed in the list with each's associated merchant advertisement relevancy score and the name/URL of the website 1200 or webpage 1202. However, the names of the websites 1200 and webpages 1202 on the merchant advertisement list may be obscured so that the list may be presented to a merchant without fully disclosing the results of the merchant promotion process to the merchant who requested the system 400 to perform this process. This may be favorable if the requesting merchant did not pay for the process yet, or so the merchant may choose which websites 1200 and webpages 1202 it wishes to pay for to be associated with for its ads. The matching unit 418 may be configured to determine that a merchant who paid to be associated with a website 1200 or webpage 1202 is to be considered the top, or one of the top relevant advertiser(s)/ad(s), whenever the matching unit 418 performs a relevancy process or advertiser relevancy process on that website 1200 or webpage 1202.

Figure 11:
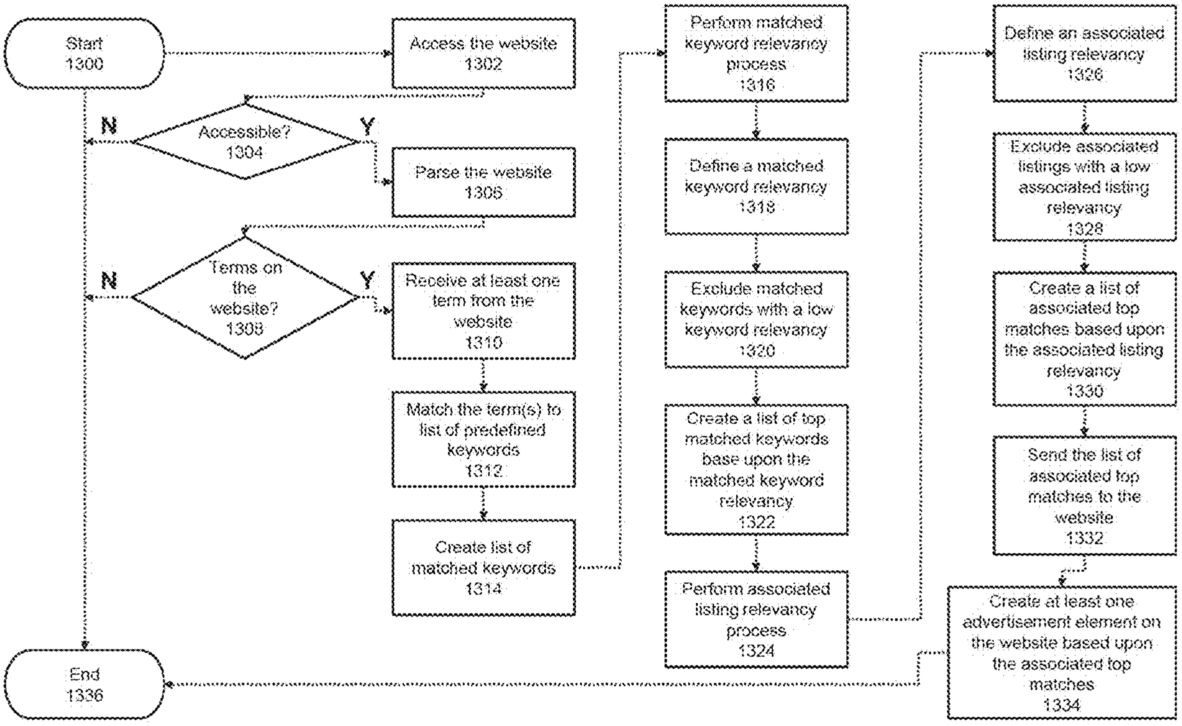
FIG. 11 is a flow chart illustration of a method to place advertisements on a website according to an embodiment of the present invention.

A method aspect of the present invention is depicted in FIG. 11. From the start (Block 1300) the website 1200 is accessed at Block 1302. At Block 1304, it is determined if the website 1200 is accessible. If it is determined at Block 1304 that the website 1200 is not accessible, then the method is ended at Block 1336. If, however, it is determined at Block 1304 that the website 1200 is accessible, then the website 1200 is parsed at Block 1306. At Block 1308, it is determined if there are any terms on the website 1200. If it is determined at Block 1308 that there are not any terms on the website 1200, then the method ends at Block 1336. If, however, it is determined at Block 1308 that there are terms on the website 1200, then at least one term is received from the website 1200 at Block 1310.

At Block 1312, the terms received from the website 1200 are matched to keywords in a list of predefined keywords. At Block 1314, a list of matched keywords is created. At Block 1316, a matched keyword relevancy process is performed on the created list of matched keywords. At Block 1318, a matched keyword relevancy is defined for each keyword in the created list of matched keywords. At Block 1320, keywords with a low keyword relevancy are excluded from the created list of matched keywords. At Block 1322, a list of top matched keywords is created based upon the matched keyword relevancy. At Block 1324, an associated listing relevancy process is performed. At Block 1326, an associated listing relevancy is defined for each associated listing.

At Block 1328, associated listings with a low associated listing relevancy are excluded. At Block 1330, a list of associated top matches is created based upon the associated listing relevancy. At Block 1332, the list of associated top matches is sent to the website 1200. At Block 1334, at least one advertisement element is created on the website 1200 based upon the list of associated top matches. The method then ends at Block 1336.

Figure 12:
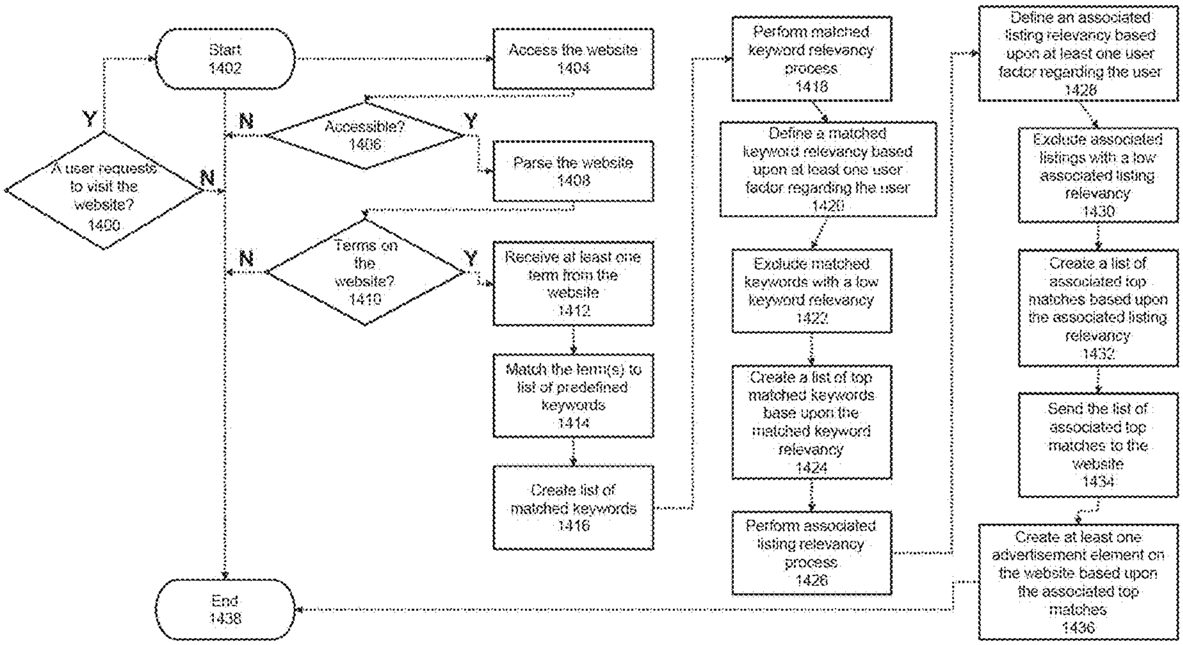
FIG. 12 is a flow chart illustration of another method to place advertisements on a webpage according to an embodiment of the present invention.

Another method aspect of the present invention is depicted in FIG. 12. The method begins at Block 1400. At Block 1400 it is determined if a user is requesting to visit a website 1200. If it is determined at Block 1400 that a user has not requested to visit the website 1200, then the method ends at block 1438. If, however, it is determined at Block 1400 that a user has requested to visit the website 1200, then the method continues to Block 1402 and the website 1200 is accessed at Block 1404. At Block 1406, it is determined if the website 1200 is accessible. If it is determined at Block 1406 that the website 1200 is not accessible, then the method is ended at Block 1438. If, however, it is determined at Block 1406 that the website 1200 is accessible, then the website 1200 is parsed at Block 1408.

At Block 1410, it is determined if there are any terms on the website 1200. If it is determined at Block 1410 that there are not any terms on the website 1200, then the method ends at Block 1438. If, however, it is determined at Block 1410 that there are terms on the website 1200, then at least one term is received from the website 1200 at Block 1412. At Block 1414, the terms received from the website 1200 are matched to keywords in a list of predefined keywords. At Block 1416, a list of matched keywords is created. At Block 1418, a matched keyword relevancy process is performed on the created list of matched keywords. At Block 1420, a matched keyword relevancy is defined for each keyword in the created list of matched keywords. At Block 1422, keywords with a low keyword relevancy are excluded from the created list of matched keywords.

At Block 1424, a list of top matched keywords is created based upon the matched keyword relevancy. At Block 1426, an associated listing relevancy process is performed. At Block 1428, an associated listing relevancy is defined for each associated listing. At Block 1430, associated listings with a low associated listing relevancy are excluded. At Block 1432, a list of associated top matches is created based upon the associated listing relevancy. At Block 1434, the list of associated top matches is sent to the website 1200. At Block 1436, at least one advertisement element is created on the website 1200 based upon the list of associated top matches. The method then ends at Block 1438.

Figure 16:
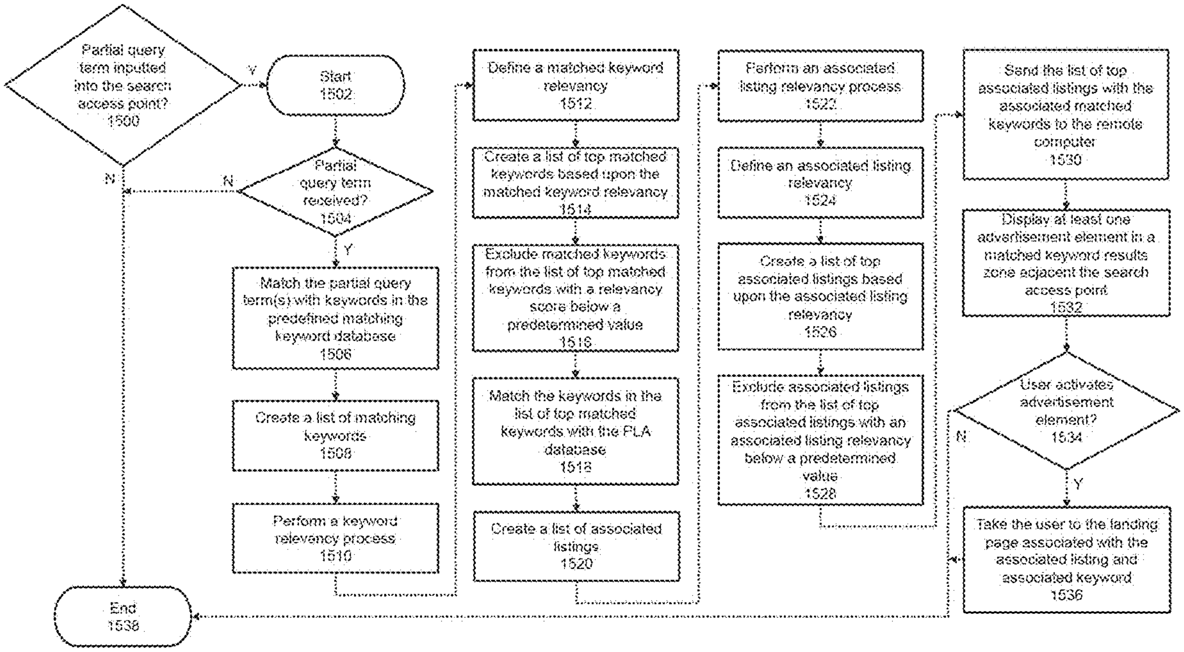
FIG. 16 is a flow chart illustration of a method to determine and display advertisement elements based on partial query terms entered in a search access point according to and embodiment of the present invention.

A method aspect of the present invention for determining and displaying an advertisement element based on partial query term(s) inputted into a search access point 600 is depicted in FIG. 16. At Block 1500, it is determined whether a partial query term has been inputted into a search access point 600. If it is determined at Block 1500 that no partial query term has been inputted into the search access point 600, then the method ends at Block 1538. If, however, it is determined at Block 1500 that a partial query term has been entered into the search access point 600, the method starts at Block 1502 and continues to Block 1504.

At Block 1504 it is determined if a partial query term has been received. If it is determined at Block 1504 that a partial query term has not been received, then the method ands at Block 1538. If, however, it is determined at Block 1504 that a partial query term has been received, the method continues to Block 1506. At Block 1506 the partial query terms are matched with keywords in a predefined matching keyword database 432. At Block 1508, a list of matching keywords is created. At Block 1510, a keyword relevancy process is performed on the list of matching keywords. At Block 1512, the keyword relevancy process defines a matched keyword relevancy.

At Block 1514, a list of top match keywords is created based upon the matched keyword relevancy. At Black 1516, matched keywords from the list of top matched keywords are excluded for having a relevancy score below a predetermined value. At Block 1518, the keywords in the list of top matched keywords are matched with the product listing advertisement (PLA) database. At Block 1520, a list of associated listings is created. At Block 1522, an associated listing relevancy process is performed. At Block 1524, an associated listing relevancy is defined by the associated listing relevancy process. At Block 1526, a list of top associated listing is created based upon the associated listing relevancy.

At Block 1528, associated listings are excluded from the list of top associated listings that have an associated listing relevancy that is below a predetermined value. At Block 1530, the list of top associated listings with the associated matched keywords are sent to the remote computer. At Block 1532, at least one advertisement element is created and displayed in a matched keywords results zone adjacent the search access point 600 at the remote computer 440. At Block 1534, it is determined whether a user of the remote computer 440 activates an advertisement element. If, at Block 1534, it is determined that a user has not activated one of the advertisement elements, then the method ends at Block 1538. If, however, at Block 1534, it is determined that a user has activated one of the advertisement elements, then at Block 1536 the user to taken to the landing page associated with the associated listing and associated keyword of the advertisement element. At Block 1538, the method ends.

Figure 9:
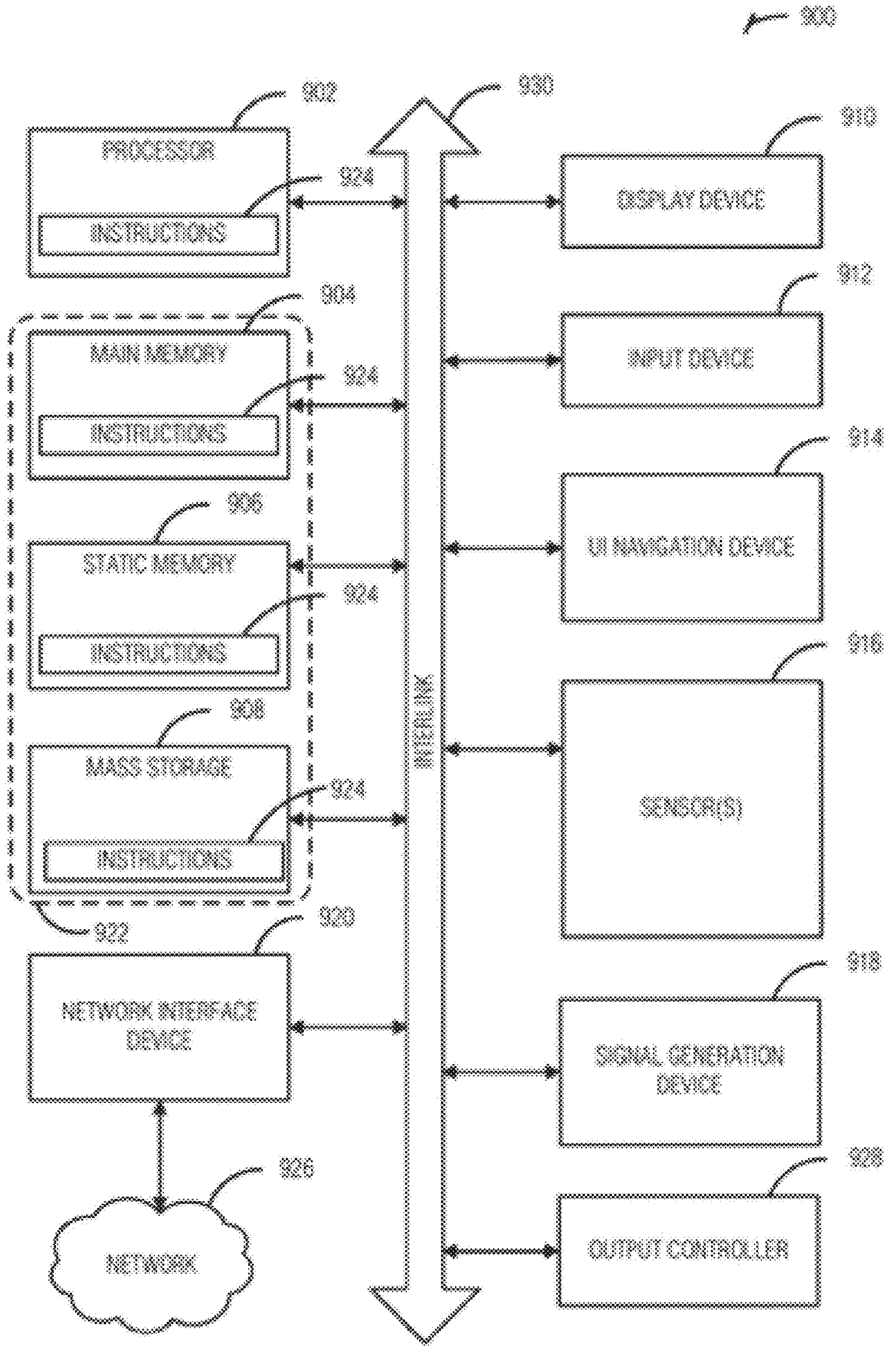
FIG. 9 is a schematic illustration of a machine according to an embodiment of the present invention.

FIG. 9 illustrates a block diagram of an example machine 900 upon which any one or more of the techniques (e.g., methods) discussed herein may perform. Examples, as described herein, may include, or may operate by, logic or several components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, movable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., wired or wirelessly networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908

(e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or another sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine-readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

The components may be implemented by one or more processors or computers. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

As may also be used herein, the terms "processor", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items. Thus, the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A computer-implemented system to determine and display advertisements to a user of a remote computer that is in communication with a network, the system comprising:
- at least one server in communication with the network;
- a data store;
- a processor;
- a controller;
- a predefined matching keyword database stored on the data store;
- a product listing advertisement (PLA) database stored on the data store; and
- a matching unit in communication with the controller;
- wherein the matching unit accesses data included in the data store and receives a partial query term inputted into a search access point at the remote computer;
- wherein the partial query term is a part of whole query term;
- wherein the matching unit matches the partial query term to the predefined matching keyword database to create a list of matching keywords;
- wherein the matching unit performs a keyword relevancy process on the list of matching keywords to define a matched keyword relevancy;
- wherein the matching unit creates a list of top matched keywords based upon the matched keyword relevancy;
- wherein the matching unit matches the top matched keywords to the PLA database to create a list of associated listings;

wherein the matching unit performs an associated listing relevancy process on the list of associated listings to define an associated listing relevancy;

wherein the matching unit creates a list of top associated listings based upon the associated listing relevancy; and wherein the matching unit sends the list of top associated listings to display at least one advertisement element in a matched keyword results zone adjacent the search access point at the remote computer upon receipt of the partial query term and prior to completion of entry of the whole query term.

2. The computer-implemented system of claim 1, wherein the partial query term includes at least one of a character, a word, a phrase, a character string, an image, a file, a video, a sound, and a form of natural language.

3. The computer-implemented system of claim 1, wherein the keyword relevancy process defines a matched keyword relevancy using at least one factor selected from the group consisting of user factors, advertiser factors, product factors, middleman factors, and rule factors.

4. The computer-implemented system of claim 3, wherein the at least one factor is received by the matching unit from at least one of a client server and a third party data store in communication with the network.

5. The computer-implemented system of claim 1, wherein the associated listing relevancy is defined using at least one factor selected from the group consisting of user factors, advertiser factors, product factors, middleman factors, and rule factors.

6. The computer-implemented system of claim 5, wherein the at least one factor is received by the matching unit from at least one of a client server and a third party data store in communication with the network.

7. The computer-implemented system of claim 1, wherein the matching unit excludes matching keywords in the list of matching keywords when creating the list of top matched keywords based on a keyword relevancy score below a predetermined value.

8. The computer-implemented system of claim 1, wherein the at least one advertisement element includes at least one of a brand title, brand text, offer card, and product card.

9. A matching unit for use in connection with a computer-implemented system, the matching unit being positioned in communication with a controller and a network, and accesses data included in a data store, the matching unit being configured to:

receive a partial query term, defined as a part of a whole query term, that is inputted into a search access point at a remote computer in communication with a network;

match the partial query term to at least one predefined matching keywords stored in a database to create a list of matching keywords;

perform a keyword relevancy process on the list of matching keywords to define a matched keyword relevancy;

create a list of top matched keywords based upon the matched keyword relevancy;

match the top matched keywords to a PLA database to create a list of associated listings;

perform an associated listing relevancy process on the list of associated listings to define an associated listing relevancy;

create a list of top associated listings based upon the associated listing relevancy; and send the list of top associated listings to display at least one advertisement element in a matched keyword results zone adjacent the search access point at the remote computer upon receipt of the partial query term and prior to completion of entry of the whole query term.

10. The computer-implemented system of claim 9, wherein the query term includes at least one of a character, a word, a phrase, a character string, an image, a file, a video, a sound, and a form of natural language.

11. The computer-implemented system of claim 9, wherein the matching unit defines the matched keyword relevancy using at least one factor selected from the group consisting of user factors, advertiser factors, product factors, middleman factors, and rule factors.

12. The computer-implemented system of claim 11, wherein the at least one factor is received by the matching unit from at least one of a client server and a third party data store in communication with the network.

13. The computer-implemented system of claim 9, wherein the matching unit defines the associated listing relevancy using at least one factor selected from the group consisting of user factors, advertiser factors, product factors, middleman factors, and rule factors.

14. The computer-implemented system of claim 13, wherein the at least one factor is received by the matching unit from at least one of a client server and a third party data store in communication with the network.

15. The computer-implemented system of claim 9, wherein the matching unit excludes matching keywords in the list of matching keywords when creating the list of top matched keywords based on a keyword relevancy score below a predetermined value.

16. The computer-implemented system of claim 9, wherein the at least one advertisement element includes at least one of a brand title, brand text, offer card, and product card.

17. A computer-implemented method to determine and display advertisements to a user of a remote computer in communication with a network, the method using at least one server in communication with a network, a data store, a processor, a controller, a predefined matching keywords database stored on the data store, a product listing advertisement (PLA) database stored on the data store, and a matching unit in communication with the controller, wherein the matching unit accesses data included in the data store, the method comprising:

receiving a partial query term input into a search access point at the remote computer, wherein a partial query term is a part of a while query term;

matching the partial query term to the predefined matching keywords database to create a list of matching keywords;

performing a keyword relevancy process on the list of matching keywords to define a matched keyword relevancy;

creating a list of top matched keywords based upon the matched keyword relevancy;

matching the top matched keywords to the PLA database to create a list of associated listings;

performing an associated listing relevancy process on the list of associated listings to define an associated listing relevancy;

creating a list of top associated listings based upon the associated listing relevancy; and sending the list of top associated listings to display at least one advertisement element in a matched keyword results zone adjacent the search access point at the remote computer upon receipt of the partial query term and prior to completion of entry of the whole query term.

18. The computer-implemented method of claim 17, wherein the partial query term includes at least one of a character, a word, a phrase, a character string, an image, a file, a video, a sound, and a form of natural language.

19. The computer-implemented method of claim 17, wherein the step of performing the keyword relevancy process to define the matched keyword relevancy further comprises using at least one factor selected from the group consisting of user factors, advertiser factors, product factors, middleman factors, and rule factors.

20. The computer-implemented method of claim 19, wherein the at least one factor is received by the matching unit from at least one of a client server and a third party data store in communication with the network.

21. The computer implemented method of claim 17, wherein the step of defining an associated listing relevancy further comprises using at least one factor selected from the group consisting of user factors, advertiser factors, product factors, middleman factors, and rule factors.

22. The computer-implemented method of claim 21, wherein the at least one factor is received by the matching unit from at least one of a client server and a third party data store in communication with the network.

23. The computer-implemented method of claim 17, wherein the step of creating the list of top matched keywords based upon the matched keyword relevancy further includes the matching unit excluding matching keywords in the list of matching keywords based on a keyword relevancy score below a predetermined value.

24. The computer-implemented method of claim 17, wherein at least one advertisement element includes at least one of a brand title, brand card, offer card, and product card.

* * * * *